United States Patent
Mohamad Abdul et al.

(10) Patent No.: US 10,142,327 B2
(45) Date of Patent: *Nov. 27, 2018

(54) RULE BASED DEVICE ENROLLMENT

(71) Applicant: Oracle International Corporation, Redwood Shores, CA (US)

(72) Inventors: Mohamad Raja Gani Mohamad Abdul, Belmont, CA (US); Bhagavati Kumar Jayanti Venkata, Bangalore (IN); Harsh Maheshwari, Indore (IN); Nagaraj Pattar, Gulbarga (IN); Ravi Verma, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/787,935

(22) Filed: Oct. 19, 2017

(65) Prior Publication Data
US 2018/0034808 A1 Feb. 1, 2018

Related U.S. Application Data

(63) Continuation of application No. 15/347,152, filed on Nov. 9, 2016, now Pat. No. 9,813,407, which is a
(Continued)

(51) Int. Cl.
*H04L 29/06* (2006.01)
*G06F 8/60* (2018.01)
(Continued)

(52) U.S. Cl.
CPC ............ *H04L 63/0823* (2013.01); *G06F 8/60* (2013.01); *G06F 8/65* (2013.01); *G06F 21/121* (2013.01);
(Continued)

(58) Field of Classification Search
CPC ....... H04L 63/20; H04L 63/205; H04L 63/08; H04L 63/0869; H04L 63/0876;
(Continued)

(56) References Cited

U.S. PATENT DOCUMENTS 7,080,078 B1 7/2006 Slaughter et al.
7,620,001 B2 11/2009 Ganji
(Continued)

FOREIGN PATENT DOCUMENTS

CN 101345757 1/2009
CN 102239482 11/2011
(Continued)

OTHER PUBLICATIONS

Can you pre-configure an app before deployment, Enterprise iOS Forums, Online retrieved from: http://www.enterpriseios.com/forum/topic/Can_you_pre_configure_an_app_before_deployment, Jan. 25, 2013, 2 pages.
(Continued)

*Primary Examiner* — Hosuk Song
(74) *Attorney, Agent, or Firm* — Kilpatrick Townsend and Stockton LLP

(57) ABSTRACT

Techniques for providing enrollment services for various types of electronic devices in a communication network is disclosed. The electronic devices may include devices associated with a user and headless devices not associated with any user. In certain embodiments, a device enrollment system is disclosed that controls the authentication and enrollment of both user devices and headless devices within a communication network. The device enrollment system detects a particular device within a communication, identifies a type of enrollment policy to be applied to the device based on a type of the device, applies a set of enrollment rules to the device in accordance with the enrollment policy
(Continued)

and enrolls the device if the device satisfies one or more criteria specified by the enrollment rules.

20 Claims, 10 Drawing Sheets

Related U.S. Application Data continuation of application No. 14/689,733, filed on Apr. 17, 2015, now Pat. No. 9,535,675.

(60) Provisional application No. 62/054,544, filed on Sep. 24, 2014.

(51) Int. Cl.
| | |
|---|---|
| G06F 21/45 | (2013.01) |
| G06F 21/30 | (2013.01) |
| H04W 4/50 | (2018.01) |
| H04W 4/60 | (2018.01) |
| H04L 12/24 | (2006.01) |
| H04L 29/08 | (2006.01) |
| H04L 9/32 | (2006.01) |
| H04W 4/08 | (2009.01) |
| H04W 12/06 | (2009.01) |
| H04W 16/06 | (2009.01) |
| G06F 8/65 | (2018.01) |
| G06F 21/12 | (2013.01) |
| H04W 4/70 | (2018.01) |
| G06F 9/451 | (2018.01) |

(52) U.S. Cl.
CPC .............. *G06F 21/30* (2013.01); *G06F 21/45* (2013.01); *H04L 9/3268* (2013.01); *H04L 41/20* (2013.01); *H04L 41/28* (2013.01); *H04L 41/5096* (2013.01); *H04L 63/10* (2013.01); *H04L 63/102* (2013.01); *H04L 63/104* (2013.01); *H04L 63/20* (2013.01); *H04L 67/02* (2013.01); *H04L 67/10* (2013.01); *H04L 67/12* (2013.01); *H04L 67/26* (2013.01); *H04L 67/306* (2013.01); *H04L 67/36* (2013.01); *H04W 4/08* (2013.01); *H04W 4/50* (2018.02); *H04W 4/60* (2018.02); *H04W 4/70* (2018.02); *H04W 12/06* (2013.01); *H04W 16/06* (2013.01); *G06F 9/452* (2018.02); *H04L 41/082* (2013.01)

(58) Field of Classification Search
CPC ... H04L 63/0823; H04L 63/101; G06F 21/44; H04W 12/08; H04W 12/06
USPC .... 726/1–7, 10, 12; 713/150, 153, 168–170, 713/173
See application file for complete search history.

(56) References Cited

U.S. PATENT DOCUMENTS

| | | | |
|---|---|---|---|
| 7,707,643 B2 | 4/2010 | DeMello et al. | |
| 7,711,796 B2 | 5/2010 | Gutt et al. | |
| 7,746,851 B2 | 6/2010 | Chandrasiri et al. | |
| 7,886,033 B2 | 2/2011 | Hopmann et al. | |
| 7,894,458 B2 * | 2/2011 | Jiang | H04L 12/18 370/401 |
| 7,925,729 B2 | 4/2011 | Bush et al. | |
| 8,086,233 B2 | 12/2011 | Millet et al. | |
| 8,281,010 B2 | 10/2012 | Ansari et al. | |
| 8,359,016 B2 | 1/2013 | Lindeman et al. | |
| 8,369,326 B2 * | 2/2013 | Ansari | G06Q 30/04 370/352 |
| 8,548,452 B2 | 10/2013 | Coskun et al. | |
| 8,572,676 B2 | 10/2013 | Sapp et al. | |
| 8,583,683 B2 | 11/2013 | Rathod | |
| 8,595,186 B1 | 11/2013 | Mandyam et al. | |
| 8,615,581 B2 * | 12/2013 | Dare | H04L 41/0253 370/352 |
| 8,650,290 B2 * | 2/2014 | Dare | G06F 3/0481 455/3.01 |
| 8,688,147 B2 | 4/2014 | Nguyen et al. | |
| 8,769,270 B2 | 7/2014 | Orsini et al. | |
| 8,812,685 B2 | 8/2014 | Fuller | |
| 8,856,289 B2 | 10/2014 | Ansari et al. | |
| 8,935,275 B2 | 1/2015 | Rathod | |
| 9,094,309 B2 * | 7/2015 | Branch | H04L 41/0853 |
| 9,106,661 B1 | 8/2015 | Stamos | |
| 9,210,183 B2 | 12/2015 | Sadovsky et al. | |
| 9,270,492 B2 * | 2/2016 | Ansari | G06Q 30/04 |
| 9,535,675 B2 | 1/2017 | Mohamad Abdul et al. | |
| 9,652,212 B2 | 5/2017 | Jayanti Venkata et al. | |
| 9,729,542 B2 | 8/2017 | Jayanti Venkata | |
| 9,749,311 B2 | 8/2017 | Jayanti Venkata et al. | |
| 9,781,098 B2 | 10/2017 | Mohamad Abdul et al. | |
| 9,813,407 B2 * | 11/2017 | Mohamad Abdul | H04L 63/0823 |
| 9,882,726 B2 * | 1/2018 | Ma | H04L 9/3263 |
| 2004/0054676 A1 | 3/2004 | McNally et al. | |
| 2005/0021567 A1 | 1/2005 | Holenstein et al. | |
| 2005/0125509 A1 | 6/2005 | Ramachandran | |
| 2005/0203673 A1 | 9/2005 | El-Hajj et al. | |
| 2006/0048142 A1 | 3/2006 | Roese et al. | |
| 2007/0055752 A1 | 3/2007 | Wiegand et al. | |
| 2007/0093243 A1 | 4/2007 | Kapadekar et al. | |
| 2007/0243862 A1 | 10/2007 | Coskun et al. | |
| 2008/0059631 A1 | 3/2008 | Bergstrom et al. | |
| 2008/0065604 A1 | 3/2008 | Tiu et al. | |
| 2008/0168072 A1 | 7/2008 | Freedman | |
| 2009/0254392 A1 | 10/2009 | Zander | |
| 2009/0265701 A1 | 10/2009 | Naslavsky et al. | |
| 2009/0287818 A1 | 11/2009 | Tachibana et al. | |
| 2009/0300742 A1 | 12/2009 | Ahn | |
| 2010/0114618 A1 | 5/2010 | Wilcock et al. | |
| 2010/0174783 A1 | 7/2010 | Zarom | |
| 2010/0185263 A1 | 7/2010 | Stevenson et al. | |
| 2011/0010340 A1 | 1/2011 | Hung et al. | |
| 2011/0282836 A1 | 11/2011 | Erickson et al. | |
| 2012/0079026 A1 | 3/2012 | Tiu, Jr. et al. | |
| 2012/0084184 A1 | 4/2012 | Raleigh et al. | |
| 2012/0106399 A1 | 5/2012 | Abendroth et al. | |
| 2012/0131327 A1 | 5/2012 | Tomlinson | |
| 2012/0179802 A1 | 7/2012 | Narasimhan et al. | |
| 2012/0274864 A1 | 11/2012 | King | |
| 2012/0278454 A1 | 11/2012 | Stewart et al. | |
| 2012/0297444 A1 | 11/2012 | Kacherov et al. | |
| 2013/0013777 A1 | 1/2013 | Krywaniuk | |
| 2013/0204948 A1 | 8/2013 | Zeyliger et al. | |
| 2013/0219307 A1 | 8/2013 | Raber et al. | |
| 2013/0247028 A1 | 9/2013 | Brooks et al. | |
| 2013/0254834 A1 | 9/2013 | King | |
| 2013/0262626 A1 | 10/2013 | Bozek et al. | |
| 2014/0006347 A1 | 1/2014 | Qureshi et al. | |
| 2014/0007084 A1 | 1/2014 | Ding | |
| 2014/0007182 A1 | 1/2014 | Qureshi et al. | |
| 2014/0007183 A1 | 1/2014 | Qureshi et al. | |
| 2014/0007214 A1 | 1/2014 | Qureshi et al. | |
| 2014/0032759 A1 | 1/2014 | Barton et al. | |
| 2014/0040975 A1 | 2/2014 | Raleigh et al. | |
| 2014/0068030 A1 | 3/2014 | Chambers et al. | |
| 2014/0082196 A1 | 3/2014 | Harrison et al. | |
| 2014/0100676 A1 | 4/2014 | Scott et al. | |
| 2014/0108801 A1 | 4/2014 | McBride et al. | |
| 2014/0113593 A1 | 4/2014 | Zhou et al. | |
| 2014/0162614 A1 | 6/2014 | Lindeman et al. | |
| 2014/0172799 A1 | 6/2014 | Dorman | |
| 2014/0199962 A1 | 7/2014 | Mohammed et al. | |
| 2014/0207220 A1 | 7/2014 | Boling et al. | |
| 2014/0229599 A1 | 8/2014 | Petrick | |
| 2014/0258970 A1 | 9/2014 | Brown et al. | |
| 2014/0259178 A1 | 9/2014 | Karaa et al. | |
| 2014/0280815 A1 | 9/2014 | Candelaria et al. | |
| 2014/0337528 A1 | 11/2014 | Barton et al. | |

(56) References Cited

U.S. PATENT DOCUMENTS

| | | | |
|---|---|---|---|
| 2014/0337862 | A1 | 11/2014 | Valencia et al. |
| 2015/0009533 | A1 | 1/2015 | Anno et al. |
| 2015/0067135 | A1 | 3/2015 | Wang et al. |
| 2015/0070585 | A1 | 3/2015 | Sharif-ahmadi et al. |
| 2015/0135060 | A1 | 5/2015 | Taylor et al. |
| 2015/0156122 | A1 | 6/2015 | Singh et al. |
| 2015/0161386 | A1 | 6/2015 | Gupta et al. |
| 2015/0205669 | A1 | 7/2015 | Sundaram et al. |
| 2015/0249684 | A1 | 9/2015 | Zhang et al. |
| 2015/0278245 | A1 | 10/2015 | Sagar et al. |
| 2015/0281087 | A1 | 10/2015 | Jalan et al. |
| 2015/0302338 | A1 | 10/2015 | Zaveri |
| 2015/0304891 | A1 | 10/2015 | Dinan |
| 2015/0356462 | A1 | 12/2015 | Fawaz et al. |
| 2016/0085533 | A1 | 3/2016 | Jayanti Venkata et al. |
| 2016/0087854 | A1 | 3/2016 | Jayanti Venkata et al. |
| 2016/0087955 | A1 | 3/2016 | Mohamad Abdul et al. |
| 2016/0087956 | A1 | 3/2016 | Maheshwari et al. |
| 2016/0088021 | A1 | 3/2016 | Jayanti Venkata et al. |
| 2016/0088026 | A1 | 3/2016 | Mohamad Abdul et al. |
| 2016/0199658 | A1 | 7/2016 | Nassif et al. |
| 2017/0063846 | A1 | 3/2017 | Mohamad Abdul et al. |
| 2017/0207985 | A1 | 7/2017 | Venkata et al. |
| 2017/0257362 | A1 | 9/2017 | Maheshwari et al. |
| 2017/0364225 | A1 | 12/2017 | Hammack et al. |
| 2017/0374061 | A1 | 12/2017 | Jayanti Venkata et al. |

FOREIGN PATENT DOCUMENTS

| | | |
|---|---|---|
| CN | 106605210 | 4/2017 |
| CN | 106664323 | 5/2017 |
| CN | 107113326 | 8/2017 |
| CN | 107431721 | 12/2017 |
| EP | 2282477 | 2/2011 |
| EP | 2676497 | 12/2013 |
| EP | 2716086 | 4/2014 |
| EP | 2757471 | 7/2014 |
| EP | 2759154 | 7/2014 |
| EP | 3198422 | 8/2017 |
| JP | 2017529627 | 10/2017 |
| JP | 2017534104 | 11/2017 |
| JP | 2017536598 | 12/2017 |
| KR | 20170063757 | 6/2017 |
| KR | 20170063788 | 6/2017 |
| KR | 20170063792 | 6/2017 |
| WO | 2008016580 | 2/2008 |
| WO | 2011123328 | 10/2011 |
| WO | 2012109751 | 8/2012 |
| WO | 2012164287 | 12/2012 |
| WO | 2013041849 | 3/2013 |
| WO | 2014036296 | 3/2014 |
| WO | 2014047168 | 3/2014 |
| WO | 2016048414 | 3/2016 |
| WO | 2016048415 | 3/2016 |
| WO | 2016048416 | 3/2016 |
| WO | 2016048417 | 3/2016 |

OTHER PUBLICATIONS

Complete Mobility Management Solutions for Samsung SAFE and KNOX Devices, Samsung for Enterprise (SAFE) Management, Online retrieved from: http://www.air-watch.com/solutions/android/samsung-for-enterprise/, Mar. 23, 2015, 4 pages.
Complete Mobility Management Solutions of Apple iOS, Apple iOS Device Management, Online retrieved from: http://www.air-watch.com/solutions/apple-ios/, Mar. 23, 2015, 5 pages.
Comprehensive App, Security, Management and Deployment, AirWatch Mobile Application Management, Online retrieved from: http://www.air-watch.com/solutions/mobile-application-management/, Mar. 23, 2015, 6 pages.
Comprehensive Security, Management and User Enablement for Android, AirWatch for Android Devices, Online retrieved from: http://www.air-watch.com/solutions/android/, Mar. 23, 2015, 3 pages.
Configure and enforce policies across compatible IronKey secure USB mobile storage devices, Access Management Software, Online retrieved from: http://www.ironkey.com/en-US/access-enterprise/, Mar. 23, 2015, 3 pages.
Flexible Containerization for Your Mobile Deployment, AirWatch Workspace Management, Online retrieved from: http://www.air-watch.com/solutions/container/, Mar. 24, 2015, 2 pages.
Manage Mobile Devices with Configuration Manager and Microsoft Intune, Online retrieved from: https://technet.microsoft.com/en-us/library/jj884158.aspx, Mar. 3, 2015, 5 pages.
Mobile Device Management for iOS, Android & Windows Phone, Online retrieved from: https://www.manageengine.com/products/desktop-central/mobile-device-management-mdm.html, Mar. 25, 2015, 4 pages.
StackOverflow—iphone plist, available online at http://stackoverflow.com/guestions/1756636/what-is-the-use-of-plist, 2009, 2 pages.
U.S. Appl. No. 14/689,722 , "Final Office Action", dated Dec. 15, 2016, 25 pages.
U.S. Appl. No. 14/689,722 , "Non-Final Office Action", dated Jun. 7, 2016, 20 pages.
U.S. Appl. No. 14/689,722 , "Notice of Allowance", dated May 5, 2017, 20 pages.
U.S. Appl. No. 14/689,733 , "Non-Final Office Action", dated Jun. 2, 2016, 6 pages.
U.S. Appl. No. 14/689,733 , "Notice of Allowance", dated Aug. 29, 2016, 5 pages.
U.S. Appl. No. 14/689,733 , "Supplemental Notice of Allowance", dated Dec. 1, 2016, 2 pages.
U.S. Appl. No. 14/689,983 , "Non-Final Office Action", dated Dec. 9, 2016, 5 pages.
U.S. Appl. No. 14/689,983 , "Notice of Allowance", dated May 30, 2017, 5 pages.
U.S. Appl. No. 14/690,034 , "Final Office Action", dated Sep. 16, 2016, 12 pages.
U.S. Appl. No. 14/690,034 , "Non-Final Office Action", dated May 19, 2016, 15 pages.
U.S. Appl. No. 14/690,034 , "Notice of Allowance", dated Jan. 5, 2017, 7 pages.
U.S. Appl. No. 14/690,045 , "*Ex Parte Quayle* Action", dated Feb. 24, 2017, 8 pages.
U.S. Appl. No. 14/690,045 , "Notice of Allowance", dated Apr. 26, 2017, 5 pages.
U.S. Appl. No. 14/690,062 , "Non-Final Office Action", dated Nov. 10, 2016, 5 pages.
U.S. Appl. No. 14/690,062 , "Notice of Allowance", dated Feb. 23, 2017, 8 pages.
U.S. Appl. No. 14/690,062 , "Supplemental Notice of Allowability", dated Apr. 28, 2017, 2 pages.
U.S. Appl. No. 14/690,062 , "Supplemental Notice of Allowance", dated May 25, 2017, 2 pages.
U.S. Appl. No. 15/347,152 , "Non-Final Office Action", dated Feb. 27, 2017, 7 pages.
U.S. Appl. No. 15/347,152 , "Notice of Allowance", dated Jun. 29, 2017, 5 pages.
Chanliau , "Extending Enterprise Access and Governance with Oracle Mobile Security", Oracle Fusion Middleware, An Oracle White Paper, Mar. 2014, 29 pages.
EP15721404.0 , "Notice of Allowance", dated Sep. 6, 2017, 7 pages.
Firtman , "Programming the Mobile Web, Publisher: O'Reilly Media", 2010, 4 pages.
PCT/US2015/026594 , "International Preliminary Report on Patentability", dated Apr. 6, 2017, 13 pages.
PCT/US2015/026594 , "International Search Report and Written Opinion", dated Aug. 10, 2015, 15 pages.
PCT/US2015/026596 , "International Preliminary Report on Patentability", dated Nov. 22, 2016, 11 pages.
PCT/US2015/026596 , "International Search Report and Written Opinion", dated Aug. 14, 2015, 13 pages.
PCT/US2015/026596 , "Written Opinion", dated Aug. 22, 2016, 7 pages.
PCT/US2015/026697 , "International Preliminary Report on Patentability", dated Sep. 2, 2016, 10 pages.

(56) References Cited

OTHER PUBLICATIONS

PCT/US2015/026697, "International Search Report and Written opinion", dated Jul. 24, 2015, 11 pages.
PCT/US2015/026697, "Written Opinion", dated Apr. 4, 2016, 8 pages.
PCT/US2015/026699, "International Preliminary Report on Patentability", dated Nov. 10, 2016, 9 pages.
PCT/US2015/026699, "International Search Report and Written Opinion", dated Aug. 6, 2015, 11 pages.
U.S. Appl. No. 15/601,832, Non-Final Office Action dated Feb. 26, 2018, 8 pages.
Chinese Patent Application No. 201580045976.3, Office Action dated Jan. 23, 2018, 5 pages.
U.S. Appl. No. 15/476,906, Non-Final Office Action dated Jan. 19, 2018, 13 pages.
U.S. Appl. No. 15/684,142, Non-Final Office Action dated Dec. 28, 2017, 12 pages.

\* cited by examiner

RULE BASED DEVICE ENROLLMENT

CROSS-REFERENCES TO RELATED APPLICATIONS

The present application is a continuation application that claims the benefit and priority of U.S. Non-Provisional application Ser. No. 15/347,152, filed Nov. 9, 2016 and entitled "RULE BASED DEVICE ENROLLMENT," which is a continuation of, and claims benefit and priority to, U.S. Non-Provisional application Ser. No. 14/689,733, filed on Apr. 17, 2015 and entitled "RULE BASED DEVICE ENROLLMENT", which is a non-provisional application of, and claims benefit and priority to, U.S. Provisional Application No. 62/054,544, filed on Sep. 24, 2014 and entitled "MOBILE SECURITY MANAGER (MSM)". The entire contents of each of these applications are hereby incorporated herein by reference for all purposes.

BACKGROUND

The present disclosure relates generally to managing remote devices in a communication network. More particularly, techniques are disclosed for providing enrollment services for various types of electronic devices in a communication network.

Mobile device management (MDM) systems and/or mobile application management (MAM) systems typically facilitate the management and control of access to resources in an enterprise by disparate electronic devices to ensure that access to these resources is secure. Management and control of access to resources within an enterprise may include communicating information about compliance and resources, and actions that must be taken for maintaining access to the enterprise.

An enterprise having thousands of users may be faced with the task of managing access for thousands of devices that access the enterprise. Enrollment of these devices is typically required to prevent unauthorized users from gaining access to the enterprise's internal network. As such, improved techniques for managing the enrollment of various types of electronic devices within a communication network are desired.

BRIEF SUMMARY

Techniques are provided (e.g., a method, a system, non-transitory computer-readable medium storing code or instructions executable by one or more processors) for providing enrollment services for various types of electronic devices in a communication network. In certain embodiments, a device enrollment system is disclosed that controls the authentication and enrollment of devices within a communication network.

In accordance with at least some embodiments, a method for enrolling a plurality of electronic devices in a communication network is disclosed. The method includes detecting, by the device enrollment system, the plurality of electronic devices in the communication network and authenticating the plurality of electronic devices. The method then includes determining that a first device of the plurality of electronic devices is associated with a human user and identifying a first enrollment policy associated with the first device. The method may include applying a first set of enrollment rules to the first device in accordance with the first enrollment policy. In some embodiments, the method may include ascertaining that a second device of the plurality of electronic devices is a headless device not dedicated to any one user and identifying a second enrollment policy associated with the second device based on the ascertaining and a geo-location of the headless device. The method may then include applying a second set of enrollment rules to the second device in accordance with the second enrollment policy. In certain embodiments, the method may then include enrolling the first device based on the first enrollment policy and enrolling the second device based on the second enrollment policy.

In some embodiments, the first enrollment policy may be identified based on an operating system or type of the first device. In some examples, the type of the first device may be a workstation, a personal computer, a tablet computer, a mobile device or a wearable device. In some examples, the headless device may include a temperature sensor, an oxygen sensor, an Electrocardiography (EKG) sensor, a camera or medical sensing equipment. The headless device may include a thermostat, a security system, a smoke alarm, a refrigerator, a dishwasher, a washing machine, a dryer, a hot water heater, an air conditioner, a centralized furnace or an oven range. The headless device may also include a printer, a scanner, a facsimile machine, video conference equipment or a Voice Over IP (VoIP) telephone.

In some embodiments, the second enrollment policy may be identified based on a trusted connection through a fixed gateway.

In some embodiments, authenticating the electronic devices may include transmitting an enrollment request to the electronic devices, receiving credential information from the electronic devices in response to the enrollment request and authenticating the devices based on the credential information.

In some embodiments, authenticating the electronic devices may include determining that the electronic devices are pre-registered with the system based on a shared secret and an identifier associated with the electronic devices, receiving an identifier encrypted with the shared secret from the electronic devices, decrypting the encrypted identifier with the shared secret and transmitting a digital certificate to the electronic devices based on the decrypting.

In accordance with some examples, the first set of enrollment rules and the second set of enrollment rules may specify information related to users in the system who can enroll the plurality of electronic devices, types of devices that can be enrolled by the one or more users of the system and a maximum number of the devices that can be enrolled by the one or more users with the system.

In some examples, the first set of enrollment rules and the second set of enrollment rules may specify information related to particular authentication mechanisms to be applied for enrolling the electronic devices with the system.

In some examples, the first set of enrollment rules and the second set of enrollment rules may specify information related to a geo-location of the electronic devices.

In accordance with some embodiments, the device enrollment system may be configured to detect a gateway device connected to one or more electronic devices in a communication network and enroll the gateway device. The device enrollment system may then be configured to receive, from the gateway device, an enrollment request to enroll the electronic devices with the system. The device enrollment system may be configured to authenticate the electronic devices, identify an enrollment policy defined for the gateway device, enroll the electronic devices in accordance with the enrollment policy and transmit to the gateway device information that enables the one or more enrolled devices to access resources of the system.

The foregoing, together with other features and embodiments will become more apparent upon referring to the following specification, claims, and accompanying drawings.

DETAILED DESCRIPTION

Figure 1:
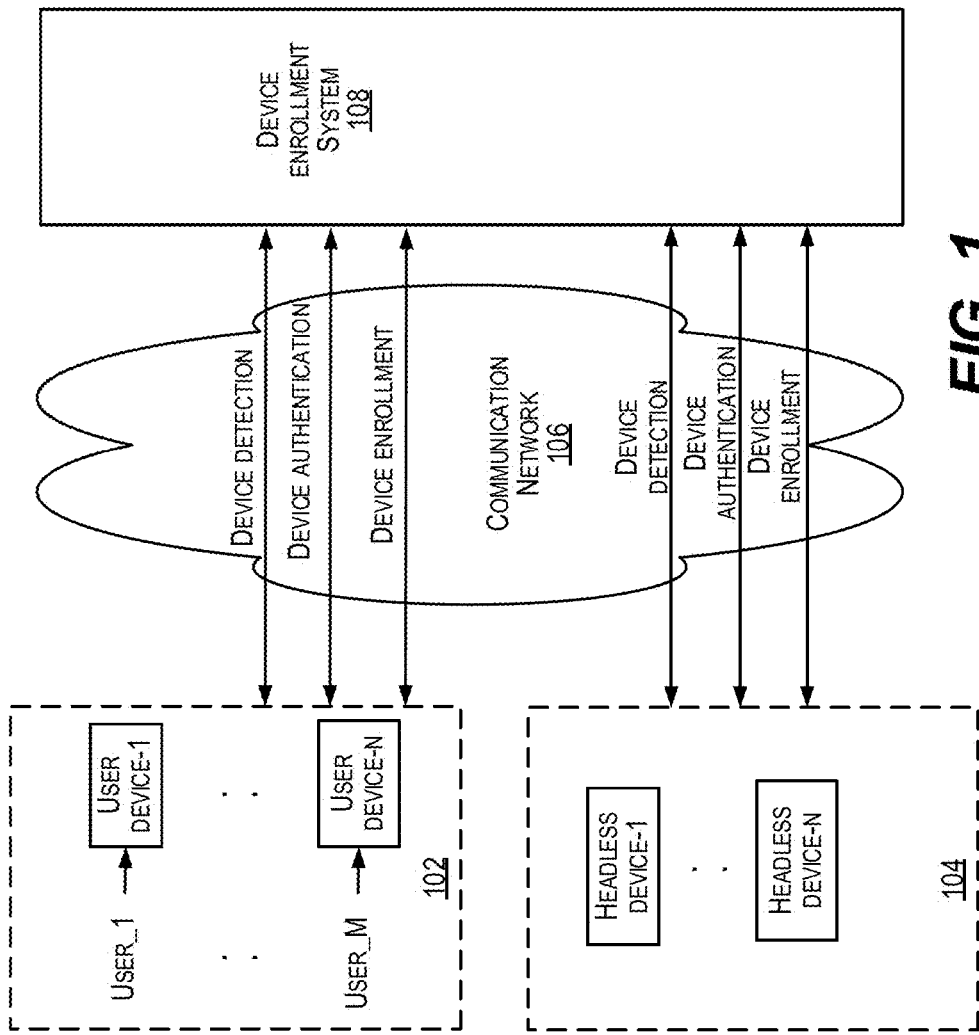
FIG. 1 depicts a simplified high-level diagram of a computing environment 100 in accordance with certain embodiments of the present invention.

In the following description, for the purposes of explanation, specific details are set forth in order to provide a thorough understanding of embodiments of the invention. However, it will be apparent that various embodiments may be practiced without these specific details. The figures and description are not intended to be restrictive.

In certain embodiments of the present invention, a device enrollment system is disclosed that controls the authentication and enrollment of disparate electronic devices within a communication network. In some examples, the device enrollment system may be implemented as a subsystem within an enterprise to provide device enrollment services for the enterprise. In other examples, the device enrollment system may be implemented as its own stand-alone service that may provide device enrollment services to an enterprise.

In some embodiments, the device enrollment system may be configured to detect a particular device within a communication network, identify a type of enrollment policy to be applied to the device based on a type of the device, apply a set of rules to the device in accordance with the enrollment policy and enroll the device if one or more criteria specified by the rules is satisfied by the device. In some examples, the device may be a device associated with a user. For instance, the device may include a personal computer, a desktop, a mobile or handheld device such as a laptop, a mobile phone, a tablet, and the like. In other examples, the device may be a headless device not associated with any user. For example, the headless device may include a gateway device, a temperature sensor, an oxygen sensor, an Electrocardiography (EKG) sensor, a camera or medical sensing equipment. The headless device may also include, for example, a thermostat, a security system, a smoke alarm, a refrigerator, a dishwasher, a washing machine, a dryer, a hot water heater, an air conditioner, a centralized furnace or an oven range. In some examples, the headless device may include a printer, a scanner, a facsimile machine, video conference equipment or a Voice Over IP (VoIP) telephone.

In accordance with at least some embodiments, the device enrollment system may be connected to a set of one or more devices in a communication network via a trusted connection through a fixed gateway device. In some aspects, the gateway device may be a registered and/or enrolled device with the device enrollment system.

In some examples, the set of one or more devices may include devices in a home's local area network (LAN) such as a thermostat, a security system, a smoke alarm, a refrigerator, a dishwasher, a washing machine, a dryer, a hot water heater, an air conditioner, a centralized furnace or an oven range. The set of one or more devices may include devices in a hospital's LAN such as a temperature sensor, an oxygen sensor, an Electrocardiography (EKG) sensor, a camera or medical sensing equipment. The set of one or more devices, in some examples, may also devices in a corporate's LAN such as a printer, a scanner, a facsimile machine, video conference equipment or a Voice Over IP (VoIP) telephone.

In some aspects, the gateway device may be configured to detect a particular device in the set of one or more devices and initiate the enrollment of the device for the device enrollment system. In some embodiments, the device enrollment system may be configured to receive an enrollment request from the gateway device and perform the authentication and enrollment of the device.

FIG. 1 depicts a simplified high-level diagram of a computing environment 100 in accordance with certain embodiments of the present invention. As shown, computing environment 100 includes one or more remote user devices 102(1)-102(N) (collectively, user devices, 102) and one or more remote headless devices 104(1)-104(N) (collectively, headless devices, 104) communicatively coupled to a device enrollment system 108 via a communication network 106. In some embodiments, device enrollment system 108 may manage the authentication and enrollment of devices 102, 104 in communication network 106 for an enterprise. As noted above, in some examples, device enrollment system 108 may be implemented as a subsystem within an enterprise. In other examples, device enrollment system 108 may also be implemented as its own stand-alone service that provides device enrollment services to an enterprise. Device enrollment system 108 may be implemented as a general purpose computer, a specialized server computer, a server farm, a server cluster, software components executed by one or more processors or any other appropriate arrangement and/or combination.

In some examples, user devices 102 may include one or more electronic devices associated with users (e.g., User_1 . . . User_M). For instance, user devices 102 may be of various types, including, but not limited to, a personal computer, a desktop, a mobile or handheld device such as a laptop, a smart phone, a tablet, and the like. User devices may also include endpoint devices, such as a workspace executing on another device. A workspace may be a controlled environment to provide access to enterprise data and applications on a device running the workspace. For example, a secure container application may run on user device 102. User devices 102 may also include, without limitation, devices (e.g., a corporate device) issued by an enterprise or a user's personal device (e.g., "bring your own device", (BYOD)).

In some examples, headless devices 104 may include electronic devices that are not associated with any user. In certain examples, headless devices 104 may include a set of one or more devices within a local area network (LAN) that connects to device enrollment system 108 via communication network 106. For example, headless devices 104 may include a set of one or more devices within a home's local area network (LAN). These devices may include, without limitation, a thermostat, a security system, a smoke alarm, a refrigerator, a dishwasher, a washing machine, a dryer, a hot water heater, an air conditioner, a centralized furnace or an oven range. Headless devices 104 may include a set of one or more devices within a hospital's LAN. These devices may include, without limitation, a temperature sensor, an oxygen sensor, an Electrocardiography (EKG) sensor, a camera or medical sensing equipment. For instance, headless devices may include a set of medical sensors in a remote monitoring system within a hospital, wherein the remote monitoring system may be enrolled by a home gateway device connected to a patient's home. Headless devices 104 may also include a set of one or more devices within a corporate's LAN. These devices may include, without limitation, a printer, a scanner, a facsimile machine, video conference equipment or a Voice Over IP (VoIP) telephone.

Communication network 106 facilitates communications between devices 102, 104 and device enrollment system 108. Communication network 106 can be of various types and can include one or more communication networks. For example, communication network 106 can include, without limitation, the Internet, a wide area network (WAN), a local area network (LAN), an Ethernet network, a public or private network, a wired network, a wireless network, and the like, and combinations thereof. Different communication protocols may be used to facilitate the communications including both wired and wireless protocols such as WebSockets that provide a full-duplex communication channel over a single TCP connection, IEEE 802.XX suite of protocols, TCP/IP, IPX, SAN, AppleTalk, Bluetooth, and other protocols. In general, communication network 106 may include any communication network or infrastructure that facilitates communications between user devices 102 and headless devices 104 and device enrollment system 108.

In some embodiments, device enrollment system 108 may be configured to perform the authentication and enrollment of user devices 102 and headless devices 104. In some examples, device enrollment system 108 may be configured to initially detect devices 102, 104 in communication network 106. There are various ways in which device enrollment system 108 may detect devices 102, 104. For instance, device enrollment system 108 may be configured to identify devices 102, 104 based on device identifiers that uniquely identify the devices. For example, a device identifier may include a MAC (media access control) address, a unique device identifier (UDID), or other device identifier. Device enrollment system 108 may then be configured to detect devices 102, 104 based on the device identifiers when the devices connect to communication network 106. Other techniques may also be used by device enrollment system 108 to detect devices 102, 104. For example, device enrollment system 108 may be configured to detect devices 102, 104 based on a geo-location of devices 102, 104 or other information associated with the devices.

Upon detecting devices 102, 104 as discussed above, in some embodiments, device enrollment system 108 may be configured to authenticate devices 102, 104. There are various ways in which device enrollment system 108 may authenticate a particular device 102 or 104. For example, device enrollment system 108 may utilize a particular authentication mechanism to authenticate a device associated with a user (e.g., user device 102) and a different authentication mechanism to authenticate a device not associated with any user (e.g., a headless device 104). The manner in which device enrollment system 108 may authenticate user devices 102 and headless devices 104 is discussed in detail in relation to FIGS. 2 and 3 respectively.

Upon successfully authenticating devices 102, 104, in some embodiments, device enrollment system 108 may be configured to determine a type of enrollment policy to be applied to devices 102, 104 to enroll the devices. In an embodiment, device enrollment system 108 may determine the type of enrollment policy by first determining the type of a particular device 102 or 104. For instance, if device enrollment system 108 determines that a particular device is a user device 102, device enrollment system 108 may identify a first enrollment policy for the device. In other examples, device enrollment system 108 may determine the type of the enrollment policy based on the user's role. For instance, a role or responsibility of a user may be one which is defined by an enterprise. For example, a user may have an 'Administrator' role, a 'Manager' role, a 'Sales Analyst' role and so on within the enterprise. A role may define an access policy for the user that includes, for example, a particular type of device that the user is allowed to use, the particular version of the device that a user in a particular role can use, and so on.

Device enrollment system 108 may then be configured to apply a first set of enrollment rules to the user device in accordance with the first enrollment policy and enroll the user device based on the first enrollment policy. In certain embodiments, device enrollment system 108 may determine that a particular device is a headless device 104. In this case, device enrollment system 108 may identify a different enrollment policy for the headless device. Device enrollment system 108 may then be configured to apply a second set of enrollment rules to headless device 104 in accordance with the enrollment policy and enroll the headless device based on the enrollment policy. In some examples, the enrollment policy used by device enrollment system 108 to enroll a user device may be different from the enrollment policy used by the device enrollment system to enroll a headless device. The manner in which the device enrollment system may enroll a user device or a headless device is described in detail in relation to FIGS. 2-4. Once successfully enrolled, remote devices 102, 104 may communicate with device enrollment system 108 to obtain access to resources of a target system (e.g., an enterprise) connected to the device enrollment system.

Figure 2:
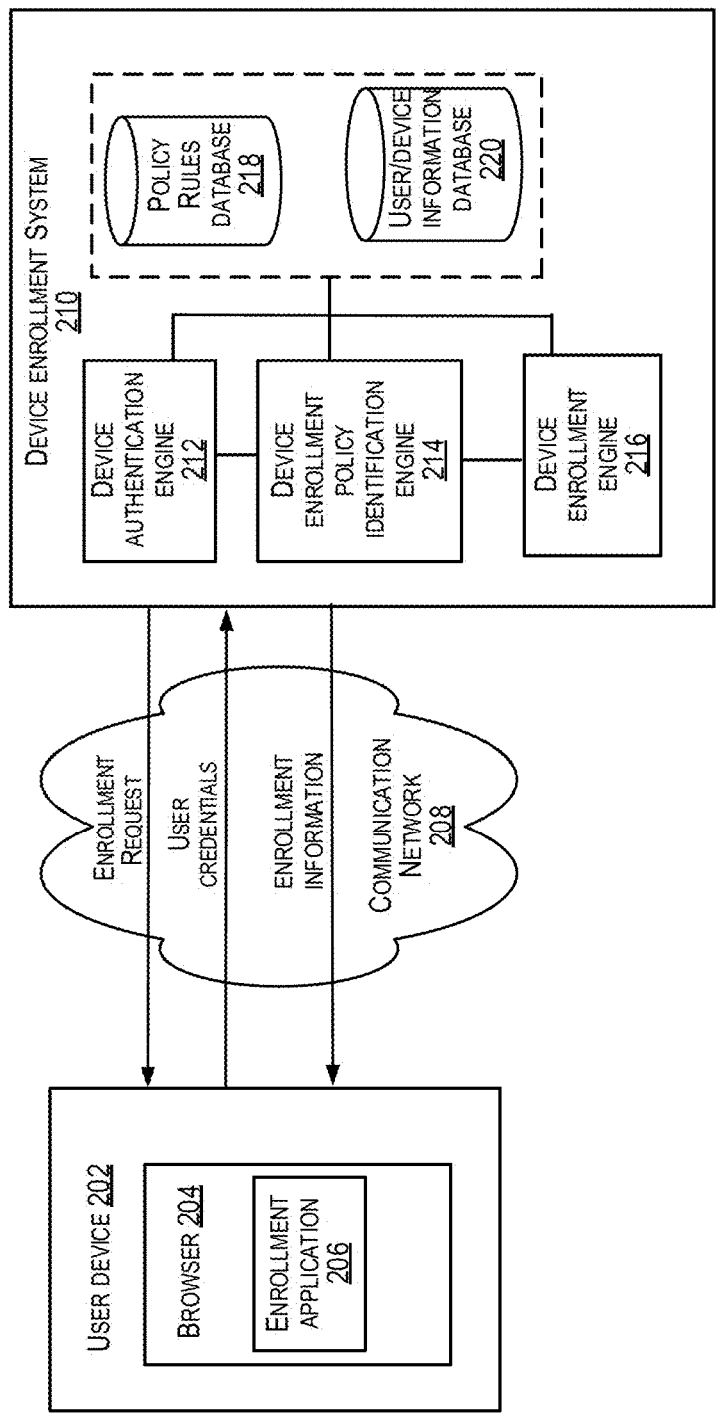
FIG. 2 depicts a simplified high-level diagram of an environment 200 of a device enrollment system according an embodiment of the present invention.

FIG. 2 depicts a simplified high-level diagram of an environment 200 of a device enrollment system according an embodiment of the present invention. Device enrollment system 210 may be the same or similar to device enrollment system 104 described in FIG. 1. In the embodiment depicted in FIG. 2, device enrollment system 210 includes a device authentication engine 212, a device enrollment policy identification engine 214 and a device enrollment engine 216. Device authentication engine 212, device enrollment policy identification engine 214 and device enrollment engine 216 may be implemented as general purpose computers, specialized server computers, server farms, server clusters, software components executed by one or more processors or any other appropriate arrangement and/or combination. The various components of device enrollment system 210 depicted in FIG. 2 are meant for illustrative purposes only and are not intended to limit the scope of embodiments of the present invention. Alternative embodiments may include more or fewer components and/or more or fewer devices than those shown in FIG. 2.

The embodiment depicted in FIG. 2 illustrates that manner in which device enrollment system 210 may perform the authentication and enrollment of a device associated with a user. For instance, as described above, a user device may include, a personal computer, a desktop, a mobile or handheld device such as a laptop, a mobile phone, a tablet, etc., or any other type of device associated with a human user.

As shown, computing environment 200 includes a user device 202 communicatively coupled to device enrollment system 210 via a communication network 208. Communication network 208 may be the same or similar to communication network 106 in FIG. 1. In some embodiments, device enrollment system 210 may first be configured to detect user device 202 connected to communication network 208. The manner in which device enrollment system 210 may detect a device is discussed in relation to FIG. 1.

Device authentication engine 212 may then be configured to authenticate user device 202. In some examples, device authentication engine 212 may first determine if a user associated with user device 202 is a registered user based on information stored about the user in user/device information database 220. In some examples, user/device information database 220 may store information about users and devices associated with users, including, a type of operating system on the remote device, a version of the operating system, a host identifier if the remote device is hosted on another device, a device type, IMEI number, a model of the remote device, a service provider (e.g., a carrier) of the remote device, a device name, a device state, or other information about the remote device. In some examples, device authentication engine 212 may authenticate a user based on information about the user stored in a user directory. In some examples, device authentication engine 212 may use various authentication mechanisms to authenticate a user such as, for example, a network authentication protocol such as Kerberos®, Hyper Text Transfer Protocol (HTTP) based authentication, authentication using an Access Manager provided by Oracle Inc.®, and so on.

In some examples, device authentication engine 212 may authenticate user device 202 by sending an enrollment request to user device 202. Device authentication engine 212 may then authenticate user device 202 as a result of a user's interaction with the enrollment request on user device 202. There are various ways in which device authentication engine 212 may send an enrollment request to user device 202. For instance, an administrator of device enrollment system 210 may initiate the enrollment request and the administrator may send the enrollment request in an email message to device 202. As another example, device authentication engine 212 may automatically send an enrollment request to an enrollment application 206 on user device 202 and a user of user device 202 may log into the enrollment application to view the enrollment request.

In some embodiments, device authentication engine 212 may specify a particular authentication mechanism to be used for authenticating user device 202. For instance, device authentication engine 212 may specify, in the enrollment request, that authentication information in the form of user credentials have to be specified by a user of user device 202 to authenticate user device 202. In other examples, device authentication engine 212 may assign a one-time password to the user of user device 202 in the enrollment request. The user may then use the one-time password to acquire a digital certificate from the device enrollment system and device authentication engine 212 may use that certificate to authenticate user device 202.

In some examples, a user associated with user device 202 may view the enrollment request received from the device enrollment system via a browser application 204 on user device 202. For instance, a user may view the enrollment request in an email message via the browser application. Or, for example, a user may view the enrollment request using enrollment application 206 on user device 202. In some examples, the enrollment request may specify an enrollment link such as an enrollment Uniform Resource Locator (URL) that the user may select in order to interact with the enrollment request. The user then may select the enrollment link to provide authentication information such as user credentials (e.g., a username and password) that identify the user and/or user device 202. User device 202 may then transmit the user credentials to device enrollment system 210. Device authentication engine 212 may then be configured to receive the user credentials from user device 210 and authenticate user device 210 based on the user credentials.

Upon successfully authenticating user device 202, device enrollment system 210 may be configured to enroll user device 202. In some embodiments, device enrollment policy identification engine 214 may be configured to first identify an enrollment policy associated with the user device. In some examples, the enrollment policy for a device (e.g., user device 202) may be identified based on the type of the device. For instance, device enrollment policy identification engine 214 may be configured to identify a first enrollment policy for user device 202. In other instances, and as will be discussed in detail in relation to FIG. 3, device enrollment policy identification engine 214 may be configured to identify a different enrollment policy for a headless device not associated with any user.

Once an enrollment policy has been identified for the device, device enrollment engine 216 may apply a set of rules to user device 202 in accordance with the enrollment policy. The rules may specify additional criteria that have to be satisfied by user device 202 in order for user device 202 to be enrolled with the device enrollment system. In some examples, the rules associated with enrolling user device 202 may be different from the rules associated with enrolling a headless device.

In some embodiments, the rules may be stored in policy rules database 218. The rules may specify for example, the types of users that can be enrolled with the device enrollment system, the types of devices that can be enrolled by the system, allowed operating system platforms (Andriod®, IOS®, Windows®) of the devices that can be enrolled, the allowed versions (e.g., minimum, maximum) of the operating system associated with the devices, the maximum number of devices that a particular user can enroll with the system and so on. In certain examples, the rules may also specify particular authentication techniques to be used for authenticating devices, the types of authentication to be used for particular users groups and/or users, and so on. For example, device enrollment system 208 may apply a stronger authentication technique to authenticate a user who belongs to a sales group within an enterprise as opposed to other users within the enterprise.

In some examples, the rules may specify information related to a geo-location of the devices. Geo-location information may include, for example, a physical location of the device, the geographical position (e.g., latitude, longitude) of the device and so on.

In some examples, the enrollment rules may also specify different types of enrollment that may be allowed for the devices. For instance, the enrollment rules may specify a MAM based enrollment for a user's personal device (for e.g., a (BYOD)) if a secure workspace application installed on the device registers with the device enrollment system. A catalog of enterprise applications may be made available to the device based on what is allowed by the policies for the user associated with the device. In other examples, the enrollment rules may specify an MDM and a MAM based enrollment for a corporate owned device since a corporate may typically want more control over the device than just control over a Secure Workspace on the device. In certain examples, the enrollment rules may specify certificate based authentication schemes for initial enrollment and subsequent communications of the device with device enrollment system or may allow selecting an entity such as a Certificate Authority (CA) that issues digital certificates to devices.

In the embodiment shown in FIG. 2, for example, device enrollment engine 216 may enroll user device 202 if user device 202 satisfies a set of rules defined by the enrollment policy for the device. For example, device enrollment engine 216 may apply a set of rules to user device 202 in accordance with the enrollment policy identified for the user device to determine if a particular type of enrollment is allowed for the user of the device, to determine if the number of devices that the user is allowed to register is within a threshold limit, to determine if the type of the device and the operating system version of the device is in accordance with the enrollment policy identified for the device, and the like.

Once device enrollment engine 216 determines that user device 202 satisfies the additional criteria specified by the rules for enrolling user device 202, then device enrollment engine 216 may enroll device 202 with the device enrollment system. In some examples, device enrollment engine 216 may generate a digital certificate for user device 202 and transmit the digital certificate to user device 202. User device 202 may provide a signed certificate to device enrollment engine 216. Device enrollment engine 216 may then register and/or enroll user device 202 using the signed digital certificate.

The embodiment depicted in FIG. 2 discussed a process for authenticating and enrolling a device associated with a user (e.g., user device 202) by device enrollment system 218. In alternative embodiments, and as discussed in FIGS. 3 and 4, device enrollment system 218 may also be configured to authenticate and enroll remote headless devices that are not associated with any user.

Figure 3:
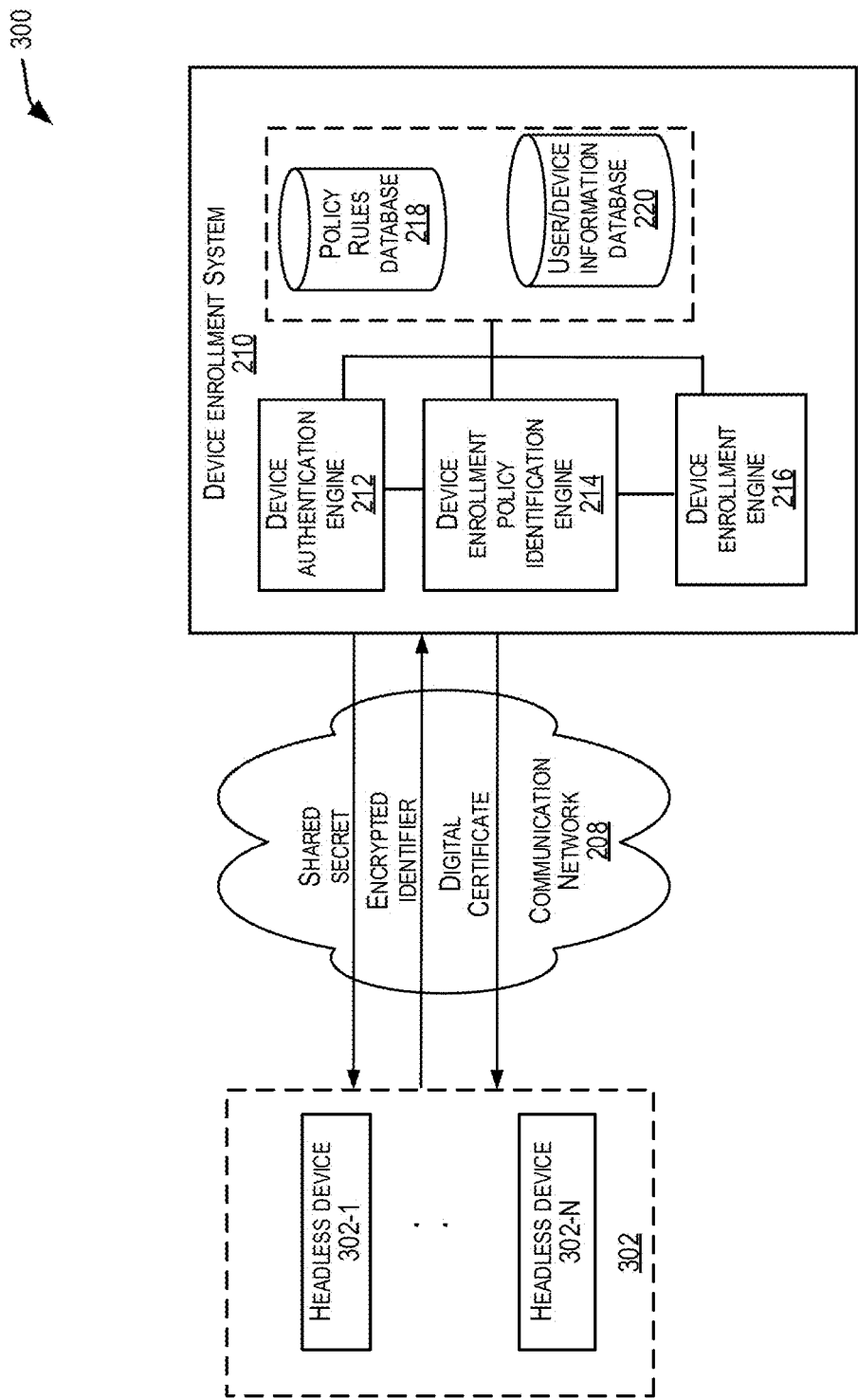
FIG. 3 depicts a simplified high-level diagram of an environment 300 that illustrates the manner in which a device enrollment system authenticates and enrolls headless devices not associated with any user, in accordance with one embodiment of the present invention.

FIG. 3 depicts a simplified high-level diagram of an environment 300 that illustrates the manner in which a device enrollment system authenticates and enrolls headless devices not associated with any user, in accordance with one embodiment of the present invention. As shown, computing environment 300 includes one or more remote headless devices 302(1)-302(N) (collectively, headless devices 302) communicatively coupled to device enrollment system 210 via a communication network 208. As discussed above, headless devices 302 may include a gateway device, a temperature sensor, an oxygen sensor, an Electrocardiography (EKG) sensor, a camera or medical sensing equipment. Headless devices 302 may also include, for example, a thermostat, a security system, a smoke alarm, a refrigerator, a dishwasher, a washing machine, a dryer, a hot water heater, an air conditioner, a centralized furnace or an oven range. In some examples, headless devices 302 may include a printer, a scanner, a facsimile machine, video conference equipment or a Voice Over IP (VoIP) telephone. As also noted above, in some embodiments, headless devices 302 may include a set of one or more devices within a home's LAN, a hospital's LAN or a corporate LAN.

Device enrollment system 210 may be the same or similar to the device enrollment system discussed in relation to FIG. 2. For example, device enrollment system 210 may include a device authentication engine 212, a device enrollment policy identification engine 214 and a device enrollment engine 216. In some examples, device authentication engine 212, device enrollment policy identification engine 214 and device enrollment engine 216 may be implemented as general purpose computers, specialized server computers, server farms, server clusters, software components executed by one or more processors or any other appropriate arrangement and/or combination.

In some embodiments, device enrollment system 210 may first be configured to detect a headless device 302 connected to communication network 208. Communication network 208 may be the same or similar to communication network 106 discussed in FIG. 1. Then device authentication engine 212 may be configured to authenticate headless device 302. In some examples, device authentication engine 212 may authenticate headless device 302 by first pre-registering headless device 302. Pre-registering headless device 302 may include, for example, identifying headless device 302 based on an identifier associated with headless device 302. For instance, an identifier for headless device 302 may be stored in user/device information database 220. The identifier may be a MAC (media access control) address, a unique device identifier (UDID), or other device identifier associated with headless device 302.

In some embodiments, device authentication engine 212 may authenticate headless device 302 based on a shared secret and the identifier associated with headless device 302. The shared secret may include, for example, a pre-shared key or a password that may be used by device authentication engine 212 to authenticate headless device 302. Headless device 302 may encrypt the identifier with the secret and send the encrypted identifier with the shared secret to device authentication engine 212. Device authentication engine 212 may receive an encrypted identifier with the shared secret from headless device 302, decrypt the identifier and determine if the decrypted identifier matches the original identifier associated with headless device 302. If a match is found, then, in some embodiments, device authentication engine 212 may authenticate headless device 302.

Upon successfully authenticating headless device 302, device enrollment system 210 may proceed to enroll headless device 302. In some embodiments, device enrollment policy identification engine 214 may be configured to identify an enrollment policy associated with headless device 302. Once an enrollment policy has been identified for headless device 302, device enrollment engine 216 may apply a set of rules stored in user/device information database 220 to headless device 302 in accordance with the enrollment policy. As discussed above, the rules may specify additional criteria that have to be satisfied by headless device 302 in order for headless device 302 to be enrolled with the device enrollment system.

For instance, the set of rules applied by device enrollment engine 216 may include determining if headless device 302 is in a certain geo-location that may be allowed or denied enrollment with the device enrollment system, determining if a particular type of enrollment is allowed for headless device 302, determining if the type of headless device 302 and the operating system version of headless device 302 is in accordance with the enrollment policy identified for headless device 302, and the like.

Once device enrollment engine 216 determines that headless device 302 satisfies the additional criteria specified by the rules, device enrollment engine 216 may enroll headless device 302. In some examples, device enrollment engine 216 may send a certificate enrollment payload to headless device 302. The payload may include information identifying the device enrollment system and a shared secret. Upon receiving the payload, headless device 302 may send a certificate signing request (CSR) to the device enrollment system. A CSR may include certificate request information, a signature algorithm identifier and a digital signature on the certification request information. A CSR may be a formatted message that headless device 302 may transmit to a certificate authority (CA) of the device enrollment system so as to validate the information required by the CA in order for the CA to issue a digital certificate. If the secret in the CSR matches, then the device enrollment system may process the CSR with the CA and provide a signed certificate and provision the certificate to headless device 302. Headless device 302 may then send a device fingerprint signed with a private key to the device enrollment system. The device enrollment system may process the device fingerprint and determine if the identifier from the fingerprint matches the signed certificate. If the device enrollment system determines that there is a match, then device enrollment system may enroll headless device 302.

The embodiments depicted in FIGS. 2 and 3 showed devices (e.g., user devices and headless devices) directly connected to device enrollment system 210 via communication network 208. In alternative embodiments, shown in FIG. 4, devices (e.g., user devices and headless devices) may be connected to communication network 208 via a trusted connection through a fixed gateway device. In some embodiments, the gateway device may be implemented as a general purpose computer, a specialized server computer, a server farm, a server cluster, software components executed by one or more processors or any other appropriate arrangement and/or combination. In certain embodiments, the gateway device may be a registered and/or enrolled device with the device enrollment system. The gateway device may be configured to detect a new device within a communication network and initiate the enrollment of the device with the device enrollment system. In some embodiments, the device enrollment system may be configured to receive an enrollment request from the gateway device and perform the authentication and enrollment of the device. The manner in which the device enrollment system may perform the enrollment and authentication of devices connected to a gateway device is discussed in detail in relation to FIG. 4.

Figure 4:
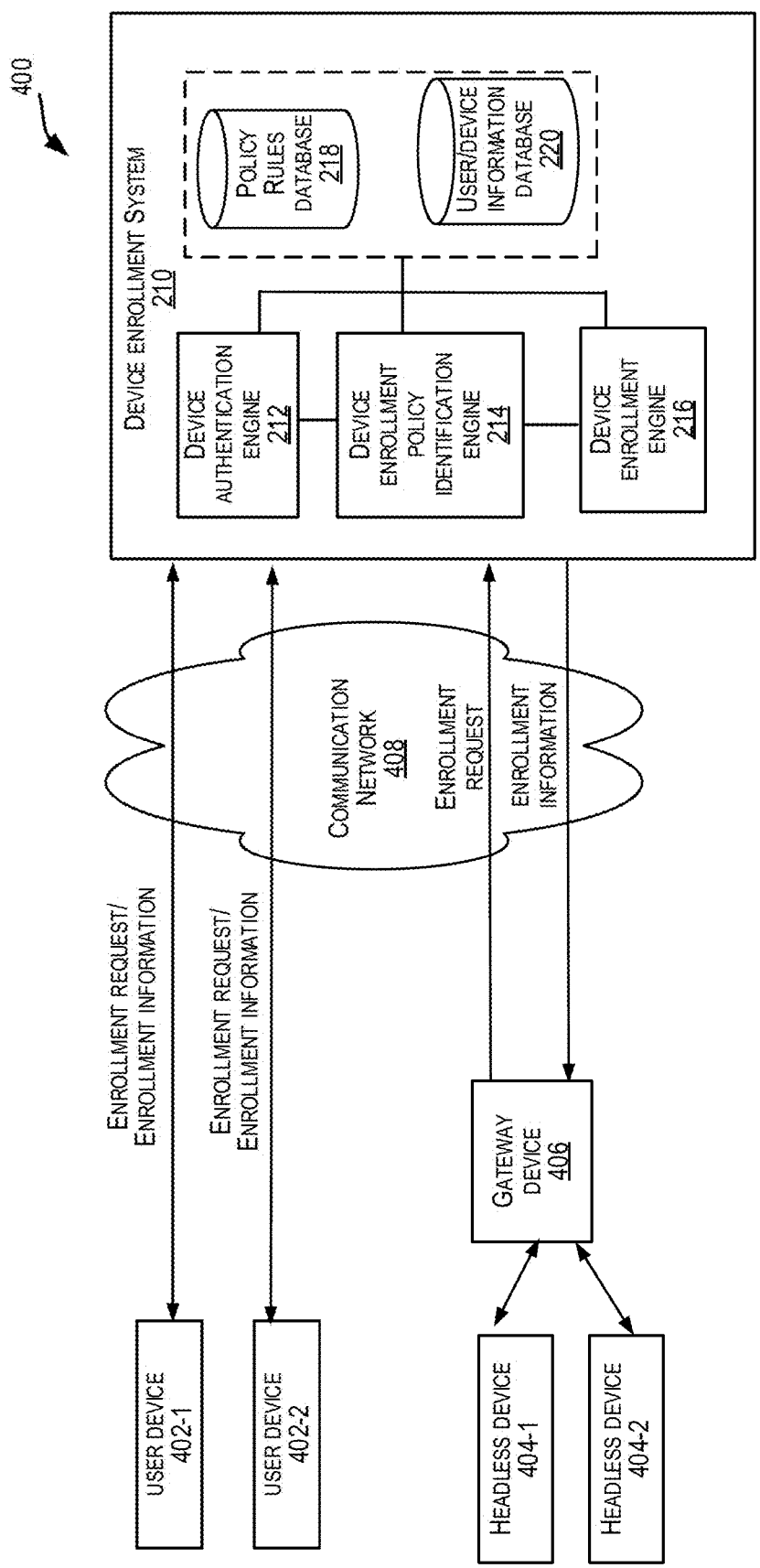
FIG. 4 depicts a simplified high-level diagram of an environment 400 that illustrates the manner in which a device enrollment system authenticates and enrolls devices connected through a fixed gateway device, in accordance with one embodiment of the present invention.

FIG. 4 depicts a simplified high-level diagram of an environment 400 that illustrates the manner in which a device enrollment system authenticates and enrolls devices connected through a fixed gateway device, in accordance with one embodiment of the present invention. As shown, computing environment 400 includes one or more user devices 402-1 and 402-2 (collectively, user devices 402) communicatively coupled to device enrollment system 210 via a communication network 408. Computing environment 400 also includes one or more headless devices 404-1 and 404-2 (collectively, headless devices 404) communicatively coupled to device enrollment system 210 via a fixed gateway device 406. Although exemplary system environment 400 is shown with two user devices and two headless devices, any number of devices may be supported, in other embodiments. User devices 402 may be the same or similar to user devices discussed in relation to FIGS. 1 and 2. Similarly, headless devices 404 may be the same or similar to headless devices discussed in relation to FIGS. 1 and 3. Communication network 408 may be the same or similar to communication network discussed in relation to FIGS. 1-3.

In some embodiments, device enrollment system 210 may manage the authentication and enrollment of user devices 402 and headless devices 404. Device enrollment system 210 may be the same or similar to device enrollment system discussed in relation to FIGS. 2 and 3. For example, device enrollment system 210 may include a device authentication engine 212, a device enrollment policy identification engine 214 and a device enrollment engine 216. In some examples, device authentication engine 212, device enrollment policy identification engine 214 and device enrollment engine 216 may be implemented as general purpose computers, specialized server computers, server farms, server clusters, software components executed by one or more processors or any other appropriate arrangement and/or combination.

In the embodiment depicted in FIG. 4, user devices 402 are shown directly connected to device enrollment system 210 via communication network 408. These devices may be authenticated and enrolled by device enrollment system 210 in a manner similar to that described in FIG. 2. Headless devices 404 are shown connected to device enrollment system 210 via fixed gateway device 406. Although the embodiment depicted in FIG. 4 illustrates headless devices 404 connected gateway device 406, in other embodiments, user devices 402 may also be connected to gateway device 406, and gateway device 406 may be configured to detect a user device (e.g., 402-1 or 402-2) and initiate the enrollment of user device 402 with device enrollment system 210.

In some embodiments, gateway device 406 may be configured to detect a headless device (e.g., 404-1 or 404-2) and initiate the enrollment of headless device 404 with device enrollment system 210. For instance, gateway device 406 may be configured to identify headless device 404 based on device identifiers that uniquely identify the device. As noted above, a device identifier may include a MAC (media access control) address, a unique device identifier (UDID), or other device identifier. Gateway device 406 may then be configured to detect headless device 404 based on the device identifiers when headless device 404 connects to gateway device 406.

Upon detecting headless device 404, gateway device 406 may be configured to transmit an enrollment request to device enrollment system 210. In some examples, the enrollment request may include fingerprint information associated with headless device 404 and a gateway certificate identifying gateway device 406. Fingerprint information may include, for example, the identifier for the device or an identifier for the device generated by gateway device 406.

In some embodiments, device authentication engine 212 may perform the authentication of headless device 404 by receiving, from the gateway device, fingerprint information of the headless device endorsed by a certificate associated with the gateway device, verifying the fingerprint information from the headless device and establishing trust in the digital certificate associated with the gateway device.

Device enrollment policy identification engine 214 may be configured to identify an enrollment policy for headless device 404. Device enrollment policy identification engine 214 may then be configured to determine if the enrollment policy associated with gateway device 406 allows registration of a particular type of headless device and if the headless device is a pre-registered device with the device enrollment system. If the enrollment policy associated with gateway device 406 allows registration of headless device 404, or if the headless device is a pre-registered device with the device enrollment system, then, in some embodiments, device enrollment engine 216 may be configured to enroll headless device 406. Device enrollment engine 216 may then be configured to verify if the type of headless device 406 as determined from the fingerprint information matches the type of the device that was recorded during pre-registration of the device. If the device type matches, then, in some embodiments, device enrollment engine 216 may proceed to register and/or enroll headless device 404 with the device enrollment system.

If the headless device is not a pre-registered device with the device enrollment system, then, in certain embodiments, device enrollment engine 216 may be configured to evaluate an enrollment policy associated with gateway device 406 to determine the number and type of devices that are allowed by gateway device 406 to be enrolled with the device enrollment system. In some examples, device enrollment engine 216 may evaluate the enrollment policy associated with gateway device 406 based on rules stored in policy rules database 218. These rules may include, for example, determining a device group associated with the gateway device, the physical location of the gateway device, the license type of a consumer of the gateway device and the like. If the rules are satisfied, then device enrollment engine 216 may accept a gateway generated registration identifier for the device and register and/or enroll headless device 404 with the device enrollment system.

Figure 5:
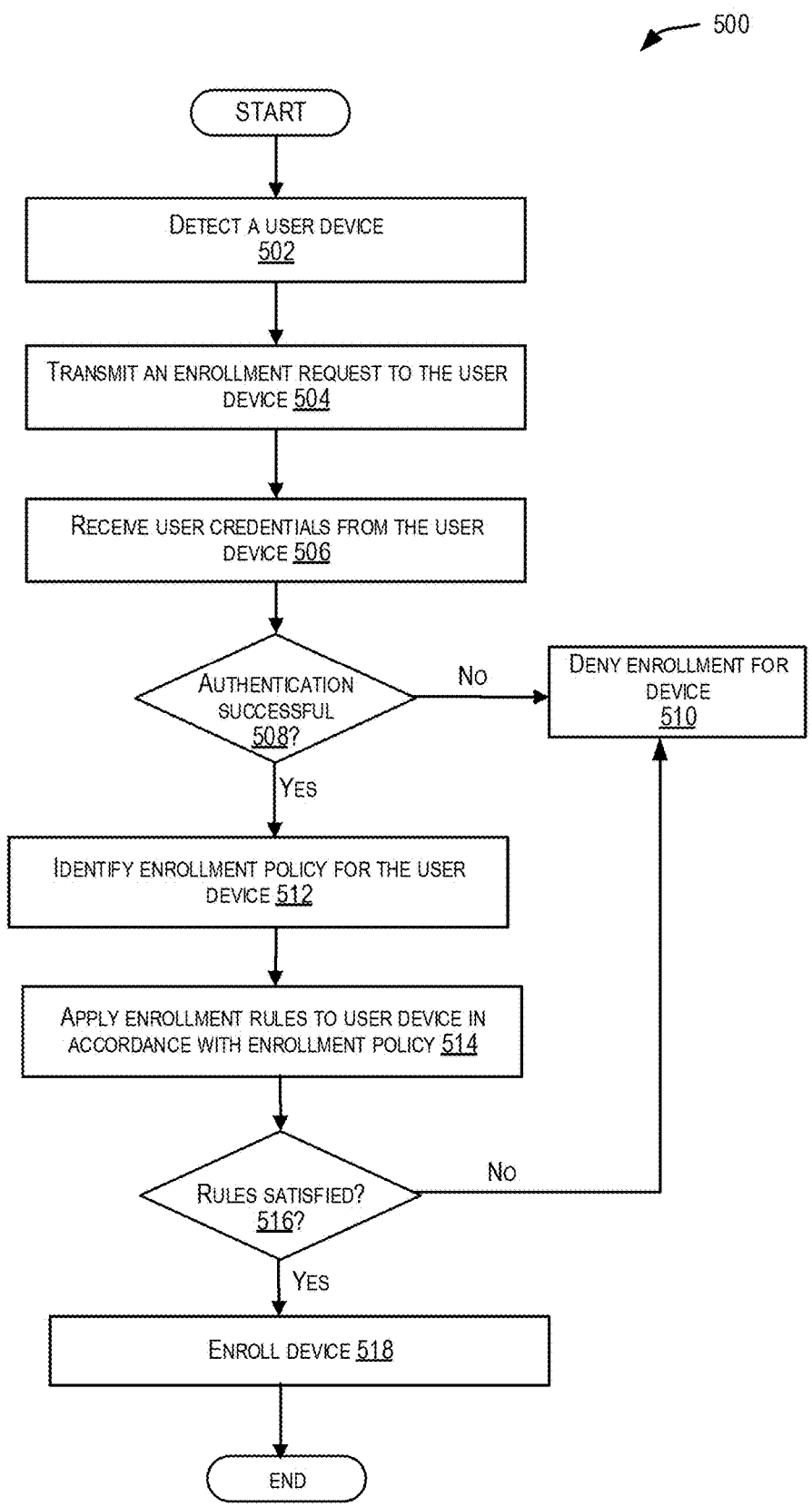
FIG. 5 illustrates a flow diagram of an example process 500 by which the device enrollment system provides enrollment services for user devices, described herein.
Figure 6:
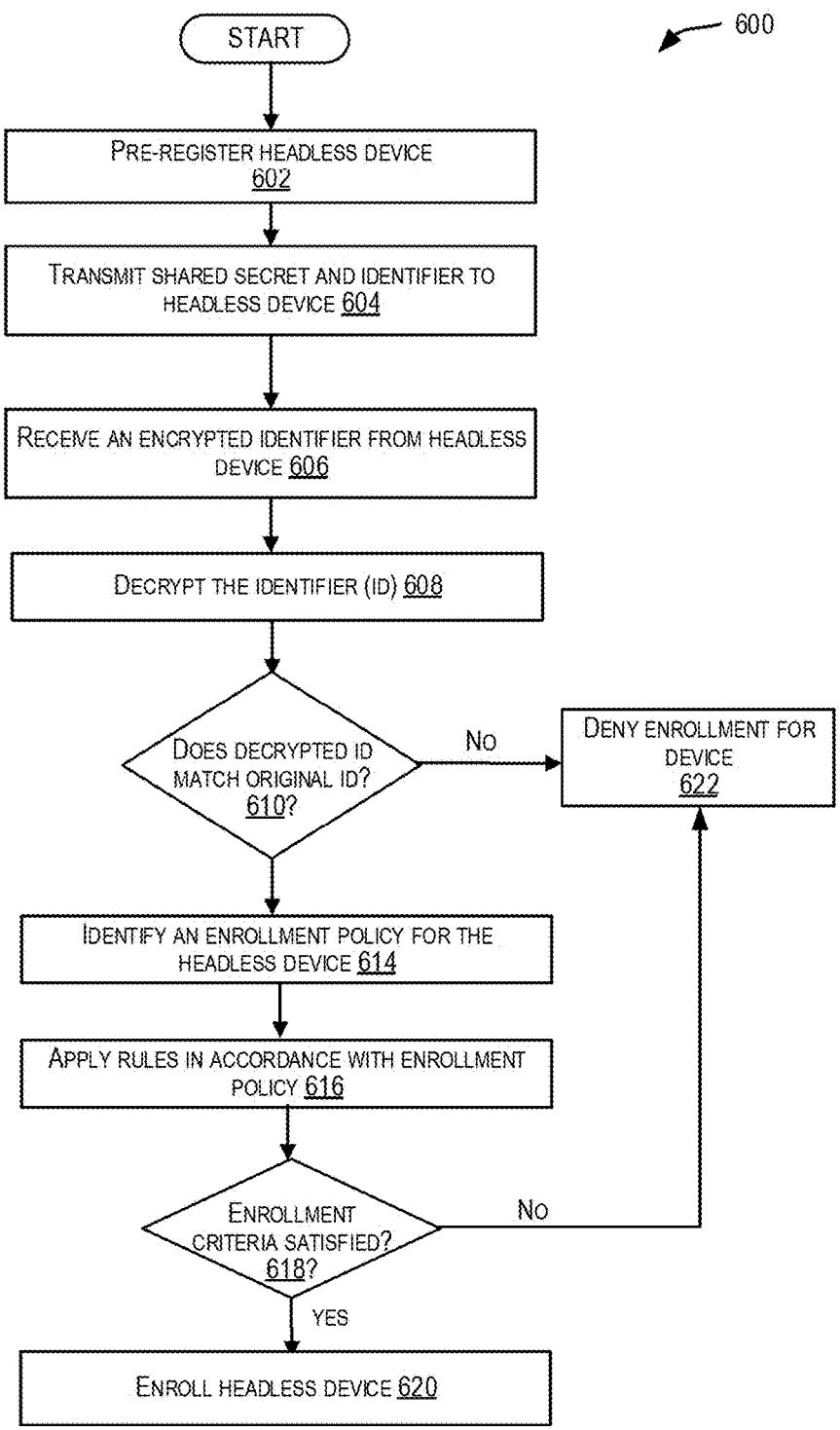
FIG. 6 illustrates a flow diagram of an example process 600 by which the device enrollment system provides enrollment services for headless devices, described herein.
Figure 7:
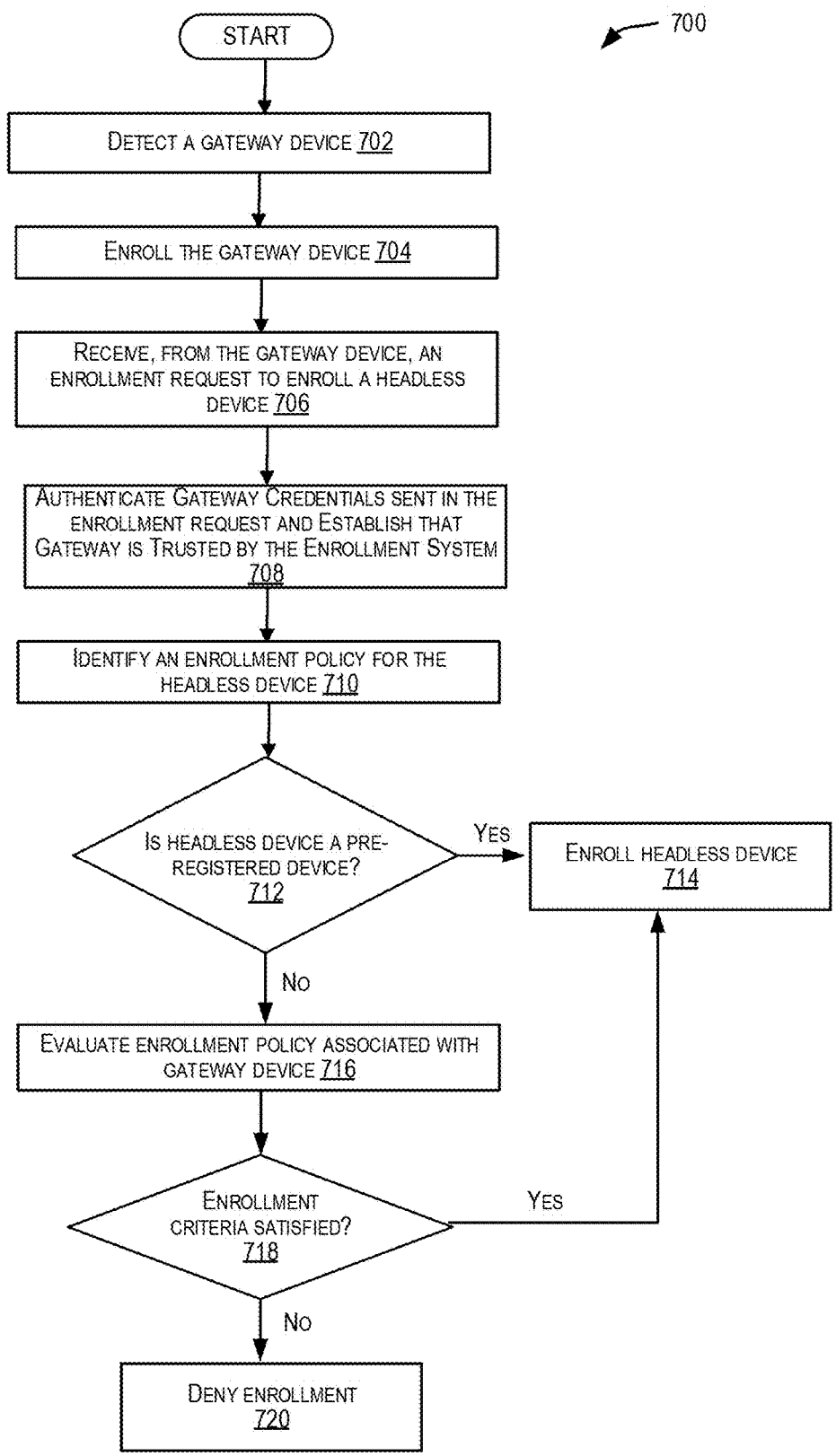
FIG. 7 illustrates a flow diagram of an example process 700 by which the device enrollment system provides enrollment services for headless devices connected to a communication network through a fixed gateway device, described herein.

FIGS. 5-7 illustrate example flow diagrams showing respective processes 500, 600 and 700 of providing device enrollment services according to certain embodiments of the present invention. These processes are illustrated as logical flow diagrams, each operation of which that can be implemented in hardware, computer instructions, or a combination thereof. In the context of computer instructions, the operations may represent computer-executable instructions stored on one or more computer-readable storage media that, when executed by one or more processors, perform the recited operations. Generally, computer-executable instructions include routines, programs, objects, components, data structures and the like that perform particular functions or implement particular data types. The order in which the operations are described is not intended to be construed as a limitation, and any number of the described operations can be combined in any order and/or in parallel to implement the process.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program including a plurality of instructions executable by one or more processors. The computer-readable storage medium may be non-transitory. In some examples, the device enrollment system 210 (e.g., utilizing at least the device authentication engine, the device enrollment policy identification engine and the device enrollment engine) shown in at least FIG. 2 (and others) may perform the processes 500, 600 and 700 of FIGS. 5-7 respectively.

FIG. 5 illustrates a flow diagram of an example process 500 for providing device enrollment services for devices associated with a user. The process at 500 may begin at 502 when a user device (e.g., user device 202) is detected by device enrollment system 210. At 504, the device enrollment system transmits an enrollment request to the user device. As discussed in relation to FIG. 2, in some examples, an administrator of the device enrollment system may initiate an enrollment request and send the enrollment request as an email message to the user device. In other examples, the device enrollment system may itself automatically send an enrollment request to an enrollment application on the user device and a user of the user device may log into the enrollment application to view the enrollment request.

At 506, the device enrollment system receives user credentials (e.g., a username and password) that identifies a user of the user device. At 508, the device enrollment system determines if the authentication of the user device is successful by comparing the received user credentials with information stored about the user in the user/device information database (e.g., 220). If the authentication of the user device is not successful, then the device enrollment system denies the enrollment for the device in 510.

If the authentication is successful, then, in some embodiments, the device enrollment system identifies an enrollment policy for the user device. At 514, the device enrollment system applies a set of enrollment rules to the user device in accordance with the enrollment policy. These rules may include for example, determining if a particular type of enrollment is allowed for the user of the device, determining if the number of devices that the user is allowed to register is within a threshold limit, determining if the type of the device and the operating system version of the device is in accordance with the enrollment policy identified for the device and so on.

At 516, the device enrollment system determines if the user device satisfies the additional criteria specified by the rules. If the user device does not satisfy the additional criteria specified by the rules, then the device enrollment system denies the enrollment for the user device in 510. If the user device satisfies the additional criteria specified by the rules, then, in some embodiments, the device enrollment system enrolls the user device in 518.

FIG. 6 illustrates a flow diagram of an example process 600 for providing device enrollment services for a headless device not associated with any user. The process at 600 may begin at 602 when a headless device (e.g., headless device 302) is detected by device enrollment system 210 and is pre-registered with the device enrollment system. At 604, the device enrollment system receives an encrypted identifier from the headless device. At 608, the device enrollment system decrypts the identifier with a shared secret and transmits a digital certificate to the headless device based on the decrypting.

In some embodiments, at 610, the device enrollment system determines if the decrypted identifier matches the identifier associated with the headless device. If the decrypted identifier does not match the identifier associated with the headless device, then the device enrollment system denies enrollment for the device. If the decrypted identifier matches the identifier associated with the headless device, then, in some embodiments, the device enrollment system authenticates the headless device at 612.

At 614, the device enrollment system identifies an enrollment policy associated with the headless device. At 616, the device enrollment system applies a set of rules to the headless device in accordance with the enrollment policy. The set of rules may include, for example, determining if a geo-location of the headless device is among a permitted list of allowed locations, determining if a particular type of enrollment is allowed for the headless device, determining if the type of the headless device and the operating system version of the headless device is in accordance with the enrollment policy identified for the headless device 302 and so on.

At 618, the device enrollment system determines if the headless device satisfies the additional criteria specified by the rules. If the headless device does not satisfy the additional criteria specified by the rules, then the device enrollment system denies the enrollment for the headless device in 622. If the headless device satisfies the additional criteria specified by the rules, then, in some embodiments, the device enrollment system enrolls the headless device in 620.

FIG. 7 illustrates a flow diagram of an example process 700 for providing device enrollment services for a headless device connected to a gateway device, in accordance with an embodiment of the present invention. The process at 700 may begin at 702 when the device enrollment system detects a gateway device. At 704, the device enrollment system enrolls the gateway device. The enrollment of the gateway device may be performed in a manner as discussed in relation to FIG. 6. At 706, the device enrollment system receives an enrollment request from the gateway device to enroll the headless device. At 708, the device enrollment system authenticates the headless device. In some embodiments, the authentication of the headless device may include receiving, from the gateway device, fingerprint information associated the headless device endorsed by a certificate associated with the gateway device, verifying the fingerprint information associated with the headless device and establishing trust in the digital certificate associated with the gateway device.

In some embodiments, at 710, the device enrollment system identifies an enrollment policy associated with the headless device. At 712, the device enrollment system determines if the headless device is a pre-registered device. If the device is a pre-registered device, then the device enrollment system enrolls the device at 714. If the device enrollment system determines that the headless device is not a pre-registered device, then, in certain embodiments, the device enrollment system evaluates the enrollment policy associated with the gateway device to determine the number and type of devices that are allowed by the gateway device to be enrolled with the device enrollment system. As noted above, the device enrollment engine may evaluate the enrollment policy associated with the gateway device based on rules stored in policy rules database (e.g, 218). These rules may include, for example, determining a device group associated with the gateway device, the physical location of the gateway device, the license type of a consumer of the gateway device and the like.

At 718, the device enrollment system determines if the enrollment criteria for the headless device are satisfied. If the enrollment criteria are satisfied, then, the device enrollment system enrolls the device in 720. If the device enrollment system determines that headless device does not satisfy the enrollment criteria, then, the device enrollment system denies the enrollment for the device.

Figure 8:
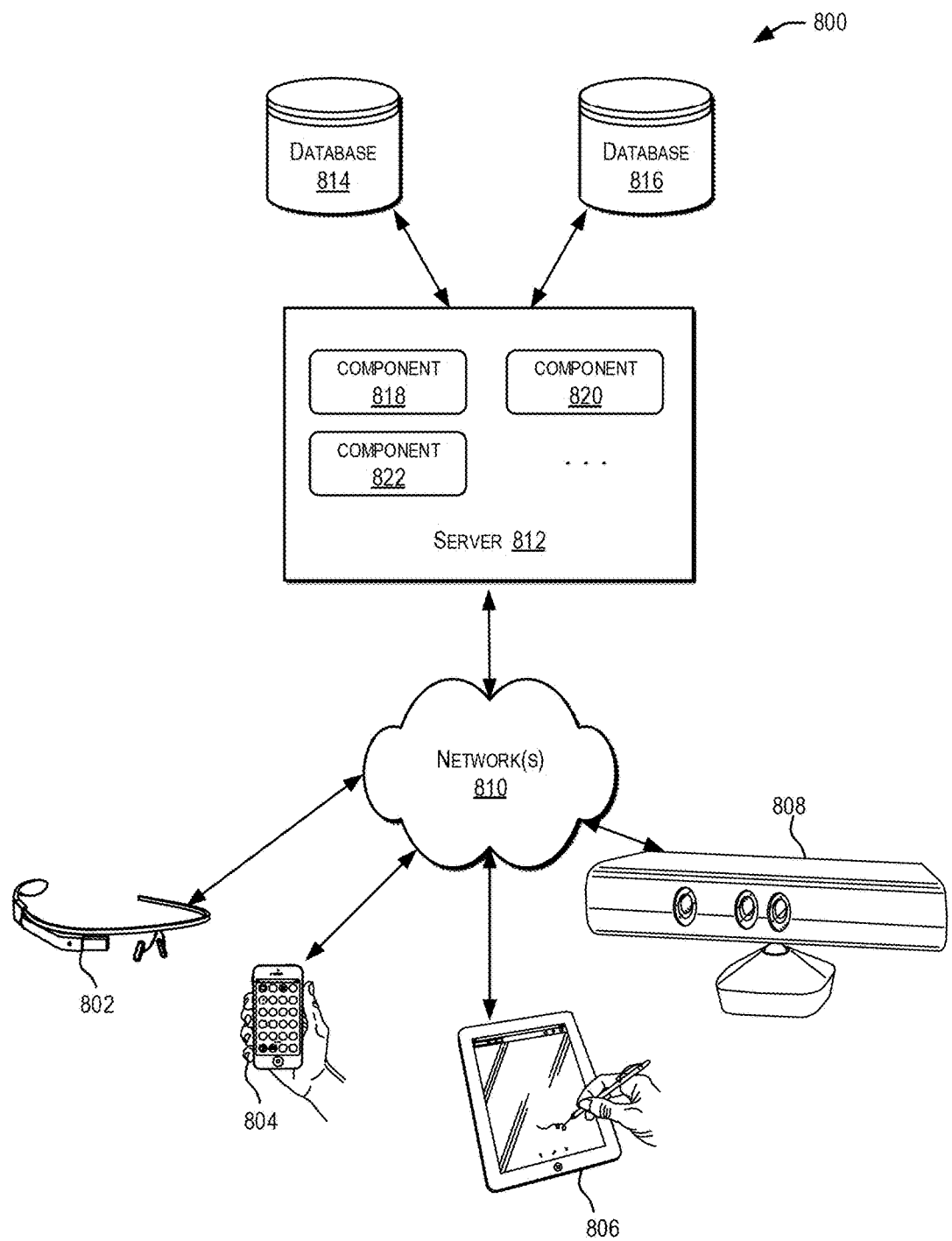
FIG. 8 depicts a simplified diagram of a distributed system 800 for implementing an embodiment.

FIG. 8 depicts a simplified diagram of a distributed system 800 for implementing an embodiment. In the illustrated embodiment, the distributed system 800 includes one or more client computing devices 802, 804, 806, and 808, which are configured to execute and operate a client application such as a web browser, proprietary client (e.g., Oracle Forms), or the like over one or more network(s) 810. The server 812 may be communicatively coupled with the remote client computing devices 802, 804, 806, and 808 via network 810.

In various embodiments, the server 812 may be adapted to run one or more services or software applications such as services and applications that provide device enrollment services. In certain embodiments, the server 812 may also provide other services or software applications can include non-virtual and virtual environments. In some embodiments, these services may be offered as web-based or cloud services or under a Software as a Service (SaaS) model to the users of the client computing devices 802, 804, 806, and/or 808. Users operating the client computing devices 802, 804, 806, and/or 808 may in turn utilize one or more client applications to interact with the server 812 to utilize the services provided by these components.

In the configuration depicted in FIG. 8, the software components 818, 820 and 822 of system 800 are shown as being implemented on the server 812. In other embodiments, one or more of the components of the system 800 and/or the services provided by these components may also be implemented by one or more of the client computing devices 802, 804, 806, and/or 808. Users operating the client computing devices may then utilize one or more client applications to use the services provided by these components. These components may be implemented in hardware, firmware, software, or combinations thereof. It should be appreciated that various different system configurations are possible, which may be different from distributed system 800. The embodiment shown in FIG. 8 is thus one example of a distributed system for implementing an embodiment system and is not intended to be limiting.

The client computing devices 802, 804, 806, and/or 808 may include various types of computing systems. For example, client device may include portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like. The devices may support various applications such as various Internet-related apps, e-mail, short message service (SMS) applications, and may use various other communication protocols. The client computing devices may also include general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Client computing devices may also include electronic devices such as a thin-client computer, an Internet-enabled gaming system (e.g., a Microsoft Xbox gaming console with or without a Kinect® gesture input device), and/or a personal messaging device, capable of communicating over the network(s) 810.

Although distributed system 800 in FIG. 8 is shown with four client computing devices, any number of client computing devices may be supported. Other devices, such as devices with sensors, etc., may interact with the server 812.

The network(s) 810 in the distributed system 800 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 810 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

The server 812 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 812 can include one or more virtual machines running virtual operating systems, or other computing architectures involving virtualization. One or more flexible pools of logical storage devices can be virtualized to maintain virtual storage devices for the server. Virtual networks can be controlled by the server 812 using software defined networking. In various embodiments, the server 812 may be adapted to run one or more services or software applications described in the foregoing disclosure. For example, the server 812 may correspond to a server for performing processing as described above according to an embodiment of the present disclosure.

The server 812 may run an operating system including any of those discussed above, as well as any commercially available server operating system. Server 812 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, the server 812 may include one or more applications to analyze and consolidate data feeds and/or event updates received from users of the client computing devices 802, 804, 806, and 808. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. The server 812 may also include one or more applications to display the data feeds and/or real-time events via one or more display devices of the client computing devices 802, 804, 806, and 808.

The distributed system 800 may also include one or more databases 814 and 816. These databases may provide a mechanism for storing information such as enrollment information, and other information used by embodiments of the present invention. Databases 814 and 816 may reside in a variety of locations. By way of example, one or more of databases 814 and 816 may reside on a non-transitory storage medium local to (and/or resident in) the server 812. Alternatively, the databases 814 and 816 may be remote from the server 812 and in communication with the server 812 via a network-based or dedicated connection. In one set of embodiments, the databases 814 and 816 may reside in a storage-area network (SAN). Similarly, any necessary files for performing the functions attributed to the server 812 may be stored locally on the server 812 and/or remotely, as appropriate. In one set of embodiments, the databases 814 and 816 may include relational databases, such as databases provided by Oracle, that are adapted to store, update, and retrieve data in response to SQL-formatted commands.

Figure 9:
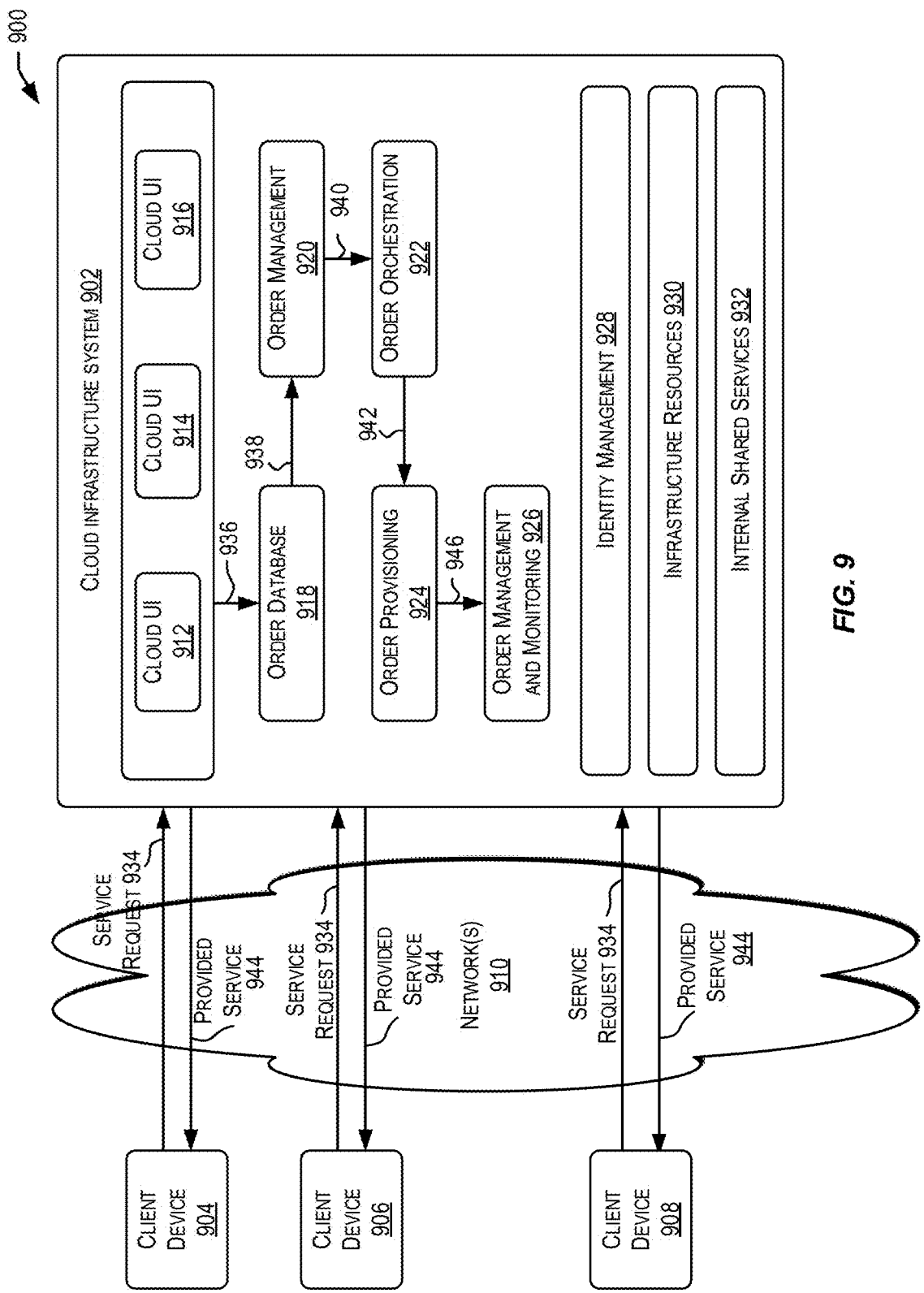
FIG. 9 is a simplified block diagram of one or more components of a system environment 900 in which services may be offered as cloud services, in accordance with an embodiment of the present disclosure.

In some embodiments, the device enrollment services described above may be offered as services via a cloud environment. FIG. 9 is a simplified block diagram of one or more components of a system environment 900 in which services may be offered as cloud services, in accordance with an embodiment of the present disclosure. In the illustrated embodiment in FIG. 9, system environment 900 includes one or more client computing devices 904, 906, and 908 that may be used by users to interact with a cloud infrastructure system 902 that provides cloud services, including services for enrolling devices based on the type of device. Cloud infrastructure system 902 may comprise one or more computers and/or servers that may include those described above for server 812.

It should be appreciated that cloud infrastructure system 902 depicted in FIG. 9 may have other components than those depicted. Further, the embodiment shown in FIG. 9 is only one example of a cloud infrastructure system that may incorporate an embodiment of the invention. In some other embodiments, cloud infrastructure system 902 may have more or fewer components than shown in the figure, may combine two or more components, or may have a different configuration or arrangement of components.

Client computing devices 904, 906, and 908 may be devices similar to those described above for 802, 804, 806, and 808. Client computing devices 904, 906, and 908 may be configured to operate a client application such as a web browser, a proprietary client application (e.g., Oracle Forms), or some other application, which may be used by a user of the client computing device to interact with cloud infrastructure system 902 to use services provided by cloud infrastructure system 902. Although exemplary system environment 900 is shown with three client computing devices, any number of client computing devices may be supported. Other devices such as devices with sensors, etc. may interact with cloud infrastructure system 902.

Network(s) 910 may facilitate communications and exchange of data between clients 904, 906, and 908 and cloud infrastructure system 902. Each network may be any type of network familiar to those skilled in the art that can support data communications using any of a variety of commercially-available protocols, including those described above for network(s) 1210.

In certain embodiments, services provided by cloud infrastructure system 902 may include a host of services that are made available to users of the cloud infrastructure system on demand. In addition to services related to device management, various other services may also be offered including without limitation online data storage and backup solutions, Web-based e-mail services, hosted office suites and document collaboration services, database processing, managed technical support services, and the like. Services provided by the cloud infrastructure system can dynamically scale to meet the needs of its users.

In certain embodiments, a specific instantiation of a service provided by cloud infrastructure system 902 may be referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 902 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

Cloud infrastructure system 902 may also provide "big data" elated computation and analysis services. The term "big data" is generally used to refer to extremely large data sets that can be stored and manipulated by analysts and researchers to visualize large amounts of data, detect trends, and/or otherwise interact with the data. This big data and related applications can be hosted and/or manipulated by an infrastructure system on many levels and at different scales. Tens, hundreds, or thousands of processors linked in parallel can act upon such data in order to present it or simulate external forces on the data or what it represents. These data sets can involve structured data, such as that organized in a database or otherwise according to a structured model, and/or unstructured data (e.g., emails, images, data blobs (binary large objects), web pages, complex event processing). By leveraging an ability of an embodiment to relatively quickly focus more (or fewer) computing resources upon an objective, the cloud infrastructure system may be better available to carry out tasks on large data sets based on demand from a business, government agency, research organization, private individual, group of like-minded individuals or organizations, or other entity.

In various embodiments, cloud infrastructure system 902 may be adapted to automatically provision, manage and track a customer's subscription to services offered by cloud infrastructure system 902. Cloud infrastructure system 902 may provide the cloud services via different deployment models. For example, services may be provided under a public cloud model in which cloud infrastructure system 902 is owned by an organization selling cloud services (e.g., owned by Oracle Corporation) and the services are made available to the general public or different industry enterprises. As another example, services may be provided under a private cloud model in which cloud infrastructure system 902 is operated solely for a single organization and may provide services for one or more entities within the organization. The cloud services may also be provided under a community cloud model in which cloud infrastructure system 902 and the services provided by cloud infrastructure system 902 are shared by several organizations in a related community. The cloud services may also be provided under a hybrid cloud model, which is a combination of two or more different models.

In some embodiments, the services provided by cloud infrastructure system 902 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 902. Cloud infrastructure system 902 then performs processing to provide the services in the customer's subscription order.

In some embodiments, the services provided by cloud infrastructure system 902 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and business flexibility for large organizations.

In some embodiments, platform services may be provided by cloud infrastructure system 902 via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by cloud infrastructure system 902 without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various business applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 902 may also include infrastructure resources 930 for providing the resources used to provide various services to customers of the cloud infrastructure system. In one embodiment, infrastructure resources 930 may include pre-integrated and optimized combinations of hardware, such as servers, storage, and networking resources to execute the services provided by the PaaS platform and the SaaS platform, and other resources.

In some embodiments, resources in cloud infrastructure system 902 may be shared by multiple users and dynamically re-allocated per demand. Additionally, resources may be allocated to users in different time zones. For example, cloud infrastructure system 902 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 932 may be provided that are shared by different components or modules of cloud infrastructure system 902 to enable provision of services by cloud infrastructure system 902. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 902 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 902, and the like.

In one embodiment, as depicted in FIG. 9, cloud management functionality may be provided by one or more modules, such as an order management module 920, an order orchestration module 922, an order provisioning module 924, an order management and monitoring module 926, and an identity management module 928. These modules may include or be provided using one or more computers and/or servers, which may be general purpose computers, specialized server computers, server farms, server clusters, or any other appropriate arrangement and/or combination.

In an exemplary operation, at 934, a customer using a client device, such as client device 904, 906 or 908, may interact with cloud infrastructure system 902 by requesting one or more services provided by cloud infrastructure system 902 and placing an order for a subscription for one or more services offered by cloud infrastructure system 902. In certain embodiments, the customer may access a cloud User Interface (UI) such as cloud UI 912, cloud UI 914 and/or cloud UI 916 and place a subscription order via these UIs. The order information received by cloud infrastructure system 902 in response to the customer placing an order may include information identifying the customer and one or more services offered by the cloud infrastructure system 902 that the customer intends to subscribe to.

At 936, the order information received from the customer may be stored in an order database 918. If this is a new order, a new record may be created for the order. In one embodiment, order database 918 can be one of several databases operated by cloud infrastructure system 918 and operated in conjunction with other system elements.

At 938, the order information may be forwarded to an order management module 920 that may be configured to perform billing and accounting functions related to the order, such as verifying the order, and upon verification, booking the order.

At 940, information regarding the order may be communicated to an order orchestration module 922 that is configured to orchestrate the provisioning of services and resources for the order placed by the customer. In some instances, order orchestration module 922 may use the services of order provisioning module 924 for the provisioning. In certain embodiments, order orchestration module 922 enables the management of business processes associated with each order and applies business logic to determine whether an order should proceed to provisioning.

As shown in the embodiment depicted in FIG. 9, at 942, upon receiving an order for a new subscription, order orchestration module 922 sends a request to order provisioning module 924 to allocate resources and configure resources needed to fulfill the subscription order. Order provisioning module 924 enables the allocation of resources for the services ordered by the customer. Order provisioning module 924 provides a level of abstraction between the cloud services provided by cloud infrastructure system 900 and the physical implementation layer that is used to provision the resources for providing the requested services. This enables order orchestration module 924 to be isolated from implementation details, such as whether or not services and resources are actually provisioned on the fly or pre-provisioned and only allocated/assigned upon request.

At 944, once the services and resources are provisioned, a notification may be sent to the subscribing customers indicating that the requested service is now ready for use. In some instance, information (e.g. a link) may be sent to the customer that enables the customer to start using the requested services.

At 946, a customer's subscription order may be managed and tracked by an order management and monitoring module 926. In some instances, order management and monitoring module 926 may be configured to collect usage statistics regarding a customer use of subscribed services. For example, statistics may be collected for the amount of storage used, the amount data transferred, the number of users, and the amount of system up time and system down time, and the like.

In certain embodiments, cloud infrastructure system 900 may include an identity management module 928 that is configured to provide identity services, such as access management and authorization services in cloud infrastructure system 900. In some embodiments, identity management module 928 may control information about customers who wish to utilize the services provided by cloud infrastructure system 902. Such information can include information that authenticates the identities of such customers and information that describes which actions those customers are authorized to perform relative to various system resources (e.g., files, directories, applications, communication ports, memory segments, etc.) Identity management module 928 may also include the management of descriptive information about each customer and about how and by whom that descriptive information can be accessed and modified.

Figure 10:
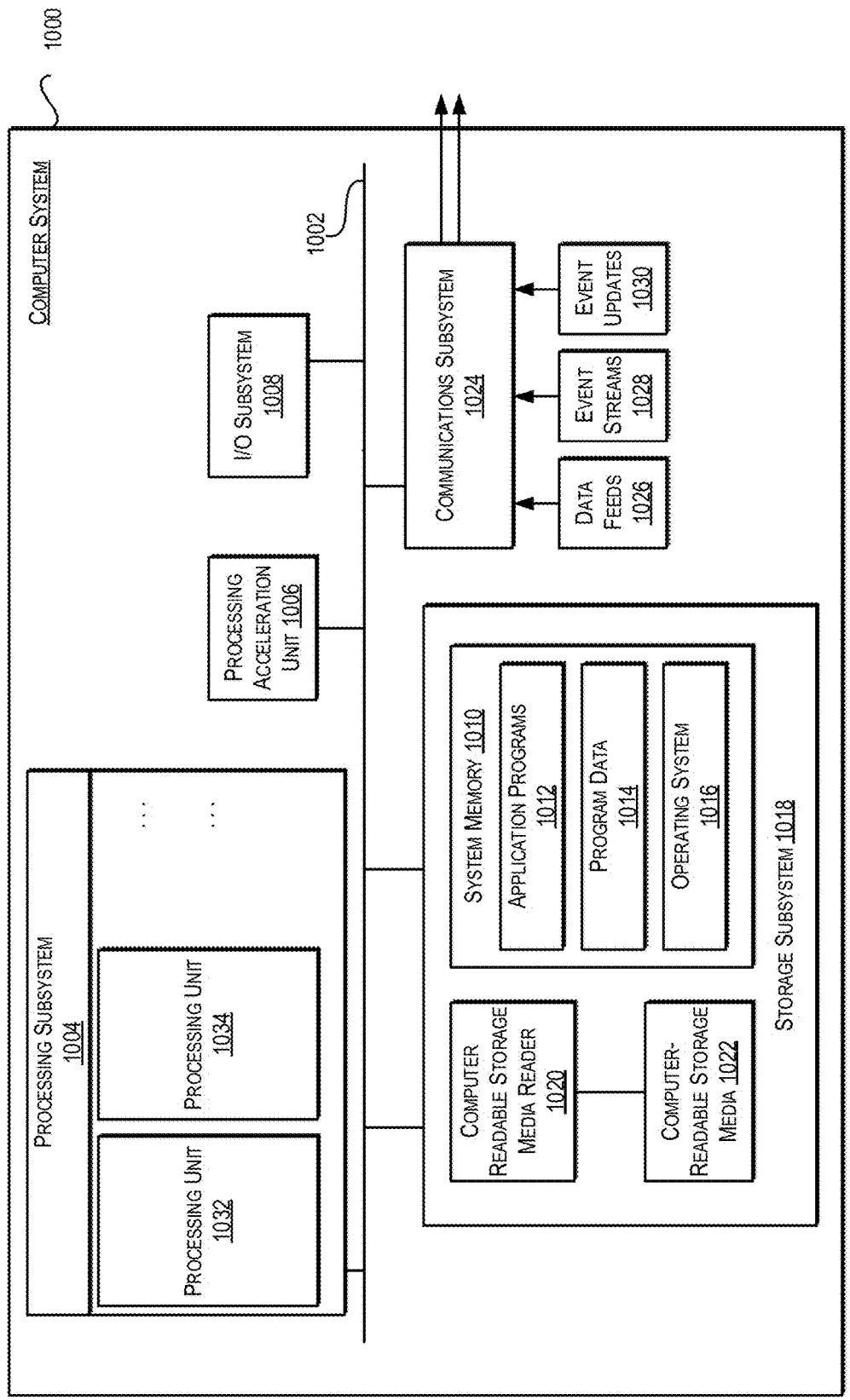
FIG. 10 illustrates an exemplary computer system 1000 that may be used to implement an embodiment of the present invention.

FIG. 10 illustrates an exemplary computer system 1000 that may be used to implement an embodiment of the present invention. In some embodiments, computer system 1000 may be used to implement any of the various servers and computer systems described above. As shown in FIG. 10, computer system 1000 includes various subsystems including a processing subsystem 1004 that communicates with a number of peripheral subsystems via a bus subsystem 1002. These peripheral subsystems may include a processing acceleration unit 1006, an I/O subsystem 1008, a storage subsystem 1018 and a communications subsystem 1024. Storage subsystem 1018 may include tangible computer-readable storage media 1022 and a system memory 1010.

Bus subsystem 1002 provides a mechanism for letting the various components and subsystems of computer system 1000 communicate with each other as intended. Although bus subsystem 1002 is shown schematically as a single bus, alternative embodiments of the bus subsystem may utilize multiple buses. Bus subsystem 1002 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like.

Processing subsystem 1004 controls the operation of computer system 1000 and may comprise one or more processing units 1032, 1034, etc. A processing unit may include be one or more processors, including single core or multicore processors, one or more cores of processors, or combinations thereof. In some embodiments, processing subsystem 1004 can include one or more special purpose co-processors such as graphics processors, digital signal processors (DSPs), or the like. In some embodiments, some or all of the processing units of processing subsystem 1004 can be implemented using customized circuits, such as application specific integrated circuits (ASICs), or field programmable gate arrays (FPGAs).

In some embodiments, the processing units in processing subsystem 1004 can execute instructions stored in system memory 1010 or on computer readable storage media 1022. In various embodiments, the processing units can execute a variety of programs or code instructions and can maintain multiple concurrently executing programs or processes. At any given time, some or all of the program code to be executed can be resident in system memory 1010 and/or on computer-readable storage media 1010 including potentially on one or more storage devices. Through suitable programming, processing subsystem 1004 can provide various functionalities described above for enrolling devices.

In certain embodiments, a processing acceleration unit 1006 may be provided for performing customized processing or for off-loading some of the processing performed by processing subsystem 1004 so as to accelerate the overall processing performed by computer system 1000.

I/O subsystem 1008 may include devices and mechanisms for inputting information to computer system 1000 and/or for outputting information from or via computer system 1000. In general, use of the term "input device" is intended to include all possible types of devices and mechanisms for inputting information to computer system 1000. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1000 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 1018 provides a repository or data store for storing information that is used by computer system 1000. Storage subsystem 1018 provides a tangible non-transitory computer-readable storage medium for storing the basic programming and data constructs that provide the functionality of some embodiments. Software (programs, code modules, instructions) that when executed by processing subsystem 1004 provide the functionality described above may be stored in storage subsystem 1018. The software may be executed by one or more processing units of processing subsystem 1004. Storage subsystem 1018 may also provide a repository for storing data used in accordance with the present invention.

Storage subsystem 1018 may include one or more non-transitory memory devices, including volatile and non-volatile memory devices. As shown in FIG. 10, storage subsystem 1018 includes a system memory 1010 and a computer-readable storage media 1022. System memory 1010 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1000, such as during start-up, may typically be stored in the ROM. The RAM typically contains data and/or program modules that are presently being operated and executed by processing subsystem 1004. In some implementations, system memory 1010 may include multiple different types of memory, such as static random access memory (SRAM) or dynamic random access memory (DRAM).

By way of example, and not limitation, as depicted in FIG. 10, system memory 1010 may store application programs 1012, which may include client applications, Web browsers, mid-tier applications, relational database management systems (RDBMS), etc., program data 1014, and an operating system 1016. By way of example, operating system 1016 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Computer-readable storage media 1022 may store programming and data constructs that provide the functionality of some embodiments. Software (programs, code modules, instructions) that when executed by processing subsystem 1004 a processor provide the functionality described above may be stored in storage subsystem 1018. By way of example, computer-readable storage media 1022 may include non-volatile memory such as a hard disk drive, a magnetic disk drive, an optical disk drive such as a CD ROM, DVD, a Blu-Ray® disk, or other optical media. Computer-readable storage media 1022 may include, but is not limited to, Zip® drives, flash memory cards, universal serial bus (USB) flash drives, secure digital (SD) cards, DVD disks, digital video tape, and the like. Computer-readable storage media 1022 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. Computer-readable media 1022 may provide storage of computer-readable instructions, data structures, program modules, and other data for computer system 1000.

In certain embodiments, storage subsystem 1000 may also include a computer-readable storage media reader 1020 that can further be connected to computer-readable storage media 1022. Together and, optionally, in combination with system memory 1010, computer-readable storage media 1022 may comprehensively represent remote, local, fixed, and/or removable storage devices plus storage media for storing computer-readable information.

In certain embodiments, computer system 1000 may provide support for executing one or more virtual machines. Computer system 1000 may execute a program such as a hypervisor for facilitating the configuring and managing of the virtual machines. Each virtual machine may be allocated memory, compute (e.g., processors, cores), I/O, and networking resources. Each virtual machine typically runs its own operating system, which may be the same as or different from the operating systems executed by other virtual machines executed by computer system 1000. Accordingly, multiple operating systems may potentially be run concurrently by computer system 1000. Each virtual machine generally runs independently of the other virtual machines.

Communications subsystem 1024 provides an interface to other computer systems and networks. Communications subsystem 1024 serves as an interface for receiving data from and transmitting data to other systems from computer system 1000. For example, communications subsystem 1024 may enable computer system 1000 to establish a communication channel to one or more client devices via the Internet for receiving and sending information from and to the client devices.

Communication subsystem 1024 may support both wired and/or wireless communication protocols. For example, in certain embodiments, communications subsystem 1024 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 1024 can provide wired network connectivity (e.g., Ethernet) in addition to or instead of a wireless interface.

Communication subsystem 1024 can receive and transmit data in various forms. For example, in some embodiments, communications subsystem 1024 may receive input communication in the form of structured and/or unstructured data feeds 1026, event streams 1028, event updates 1030, and the like. For example, communications subsystem 1024 may be configured to receive (or send) data feeds 1026 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1024 may be configured to receive data in the form of continuous data streams, which may include event streams 1028 of real-time events and/or event updates 1030, that may be continuous or unbounded in nature with no explicit end. Examples of applications that generate continuous data may include, for example, sensor data applications, financial tickers, network performance measuring tools (e.g. network monitoring and traffic management applications), click-stream analysis tools, automobile traffic monitoring, and the like.

Communications subsystem 1024 may also be configured to output the structured and/or unstructured data feeds 1026, event streams 1028, event updates 1030, and the like to one or more databases that may be in communication with one or more streaming data source computers coupled to computer system 1000.

Computer system 1000 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of computer system 1000 depicted in FIG. 10 is intended only as a specific example. Many other configurations having more or fewer components than the system depicted in FIG. 10 are possible. Based on the disclosure and teachings provided herein, a person of ordinary skill in the art will appreciate other ways and/or methods to implement the various embodiments.

Although specific embodiments of the invention have been described, various modifications, alterations, alternative constructions, and equivalents are also encompassed within the scope of the invention. Embodiments of the present invention are not restricted to operation within certain specific data processing environments, but are free to operate within a plurality of data processing environments. Additionally, although embodiments of the present invention have been described using a particular series of transactions and steps, it should be apparent to those skilled in the art that the scope of the present invention is not limited to the described series of transactions and steps. Various features and aspects of the above-described embodiments may be used individually or jointly.

Further, while embodiments of the present invention have been described using a particular combination of hardware and software, it should be recognized that other combinations of hardware and software are also within the scope of the present invention. Embodiments of the present invention may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for interprocess communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific invention embodiments have been described, these are not intended to be limiting. Various modifications and equivalents are within the scope of the following claims.

What is claimed is:

1. A system comprising:
   memory configured to store computer-executable instructions; and
   at least one processor configured to access the memory and execute the computer-executable instructions to collectively at least:
   detect a gateway device connected to one or more electronic devices in a communication network;
   receive, from the gateway device, an enrollment request requesting enrollment of an electronic device of the one or more electronic devices with the system, the enrollment request including fingerprint information associated with the electronic device endorsed by a certificate associated with the gateway device;
   identify an enrollment policy associated with the electronic device;
   enroll the electronic device in accordance with the enrollment policy based on verifying the fingerprint information associated with the electronic device; and
   transmit, to the gateway device, information that enables the electronic device to access resources of the system.

2. The system of claim 1, wherein the computer-executable instructions further comprise instructions to:
   transmit the enrollment request to the electronic device;
   receive credential information from the electronic device in response to the enrollment request; and
   authenticate the electronic device based on the credential information.

3. The system of claim 1, wherein the computer-executable instructions further comprise instructions to:
   determine that the electronic device is pre-registered with the system based on a shared secret and an identifier associated with the one or more electronic devices;
   receive an encrypted identifier from the electronic device;
   decrypt the encrypted identifier with the shared secret; and
   transmit a digital certificate to the electronic device based on the decrypting.

4. The system of claim 1, wherein the computer-executable instructions further comprise instructions to:
   apply a set of enrollment rules defined by the enrollment policy to the electronic device; and
   enroll the electronic device in accordance with the set of enrollment rules.

5. The system of claim 4, wherein the set of enrollment rules specify at least one of information related to users in the system who can enroll the electronic device, types of devices that can be enrolled by the one or more users of the system, or a maximum number of the devices that can be enrolled by the one or more users with the system.

6. The system of claim 4, wherein the set of enrollment rules specify information related to authenticating the electronic device for enrolling the electronic device with the system.

7. The system of claim 4, wherein the set of enrollment rules specify information related to a geo-location of the electronic device.

8. The system of claim 1, wherein the one or more electronic devices comprise a headless device, the headless device comprising at least one of a printer, a scanner, a facsimile machine, video conference equipment, or a Voice Over IP (VoIP) telephone.

9. The system of claim 1, wherein the one or more electronic devices comprise a temperature sensor, an oxygen sensor, an Electrocardiography (EKG) sensor, a camera, or medical sensing equipment.

10. The system of claim 1, wherein the enrollment policy is identified based at least in part on a trusted connection through the gateway device.

11. A method comprising:
  receiving, from a gateway device connected to one or more electronic devices in a communication network, an enrollment request requesting enrollment of an electronic device of the one or more electronic devices with a system, the enrollment request including fingerprint information associated with the electronic device endorsed by a certificate associated with the gateway device;
  identifying an enrollment policy associated with the electronic device;
  applying a set of enrollment rules defined by the enrollment policy to the electronic device;
  enrolling the electronic device in accordance with the set of enrollment rules based on verifying the fingerprint information associated with the electronic device; and
  transmitting, to the gateway device, information that enables the electronic device to access resources of the system.

12. The method of claim 11, wherein the method further comprises:
  transmitting the enrollment request to the electronic device;
  receiving credential information from the electronic device in response to the enrollment request; and
  authenticating the electronic device based on the credential information.

13. The method of claim 11, wherein the method further comprises:
  determining that the electronic device is pre-registered with the system based on a shared secret and an identifier associated with the one or more electronic devices;
  receiving an encrypted identifier from the electronic device;
  decrypting the encrypted identifier with the shared secret; and
  transmitting a digital certificate to the electronic device based on the decrypting.

14. The method of claim 11, wherein the set of enrollment rules are stored in a policy rules database.

15. The method of claim 11, wherein the set of enrollment rules specify information related to a geo location of the electronic device.

16. One or more non-transitory computer-readable media storing computer-executable instructions executable by one or more processors, the computer-executable instructions comprising:
  instructions that cause the one or more processors to receive, from a gateway device connected to one or more electronic devices in a communication network, an enrollment request requesting enrollment of an electronic device of the one or more electronic devices with a system, the enrollment request including fingerprint information associated with the electronic device endorsed by a certificate associated with the gateway device;
  instructions that cause the one or more processors to identify an enrollment policy associated with the electronic device;
  instructions that cause the one or more processors to apply a set of enrollment rules defined by the enrollment policy to the electronic device;
  instructions that cause the one or more processors to enroll the electronic device in accordance with the set of enrollment rules based on verifying the fingerprint information associated with the electronic device; and
  instructions that cause the one or more processors to transmit, to the gateway device, information that enables the electronic device to access resources of the system.

17. The computer-readable media of claim 16, wherein the instructions further comprise instructions to:
  transmit the enrollment request to the electronic device;
  receive credential information from the electronic device in response to the enrollment request; and
  authenticate the electronic device based on the credential information.

18. The computer-readable media of claim 16, wherein the instructions further comprise instructions to:
  determine that the electronic device is pre-registered with the system based on a shared secret and an identifier associated with the one or more electronic devices;
  receive an encrypted identifier from the electronic device;
  decrypt the encrypted identifier with the shared secret; and
  transmit a digital certificate to the electronic device based on the instructions to decrypt.

19. The computer-readable media of claim 16, wherein the set of enrollment rules are stored in a policy rules database.

20. The computer-readable media of claim 16, wherein the one or more electronic devices comprise a temperature sensor, an oxygen sensor, an Electrocardiography (EKG) sensor, a camera, or medical sensing equipment.

* * * * *

UNITED STATES PATENT AND TRADEMARK OFFICE
CERTIFICATE OF CORRECTION

PATENT NO. : 10,142,327 B2
APPLICATION NO. : 15/787935
DATED : November 27, 2018
INVENTOR(S) : Mohamad Abdul et al.

Page 1 of 1

It is certified that error appears in the above-identified patent and that said Letters Patent is hereby corrected as shown below:

In the Specification

In Column 8, Line 61, delete "(Andriod®," and insert -- (Android®, --, therefor.

Signed and Sealed this
Third Day of December, 2019

Andrei Iancu
*Director of the United States Patent and Trademark Office*